United States Patent
Kawate et al.

(10) Patent No.: US 9,697,868 B2
(45) Date of Patent: *Jul. 4, 2017

(54) RECORDING APPARATUS, REPRODUCTION APPARATUS AND FILE MANAGEMENT METHOD

(75) Inventors: Fumitaka Kawate, Kanagawa (JP); Makoto Yamada, Tokyo (JP); Mitsuhiro Hirabayashi, Tokyo (JP); Toshihiro Ishizaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1140 days.

This patent is subject to a terminal disclaimer.

(21) Appl. No.: 13/413,789

(22) Filed: Mar. 7, 2012

(65) Prior Publication Data

US 2012/0170910 A1    Jul. 5, 2012

Related U.S. Application Data

(63) Continuation of application No. 12/189,957, filed on Aug. 12, 2008, now Pat. No. 8,224,156, which is a
(Continued)

(30) Foreign Application Priority Data

Jan. 21, 2003   (JP) ................................ 2003-011995

(51) Int. Cl.
G11B 27/034    (2006.01)
G11B 27/10     (2006.01)
(Continued)

(52) U.S. Cl.
CPC ............ *G11B 27/034* (2013.01); *G11B 27/10* (2013.01); *H04N 5/935* (2013.01); *H04N 21/854* (2013.01); *H04N 21/85406* (2013.01)

(58) Field of Classification Search
CPC ................. G11B 27/034; G11B 27/10; H04N 21/85406; H04N 21/854; H04N 5/935
(Continued)

(56) References Cited

U.S. PATENT DOCUMENTS 6,018,506 A    1/2000  Okabe et al.
6,209,092 B1   3/2001  Linnartz
(Continued)

FOREIGN PATENT DOCUMENTS

EP    1 089 278    4/2001
EP    1 263 226    12/2002
(Continued)

OTHER PUBLICATIONS

Apple Computer: "Quicktime File Format", Announcement Apple Computer, XX, XX, Jan. 1, 2000 (Jan. 1, 2000), pp. 1-351, XP002292974.
(Continued)

*Primary Examiner* — Gelek W Topgyal
(74) *Attorney, Agent, or Firm* — Haug Partners LLP; William S. Frommer

(57) ABSTRACT

A recording apparatus, a reproduction apparatus and a file management method are disclosed wherein, even if one of files recorded on a recording medium cannot be reproduced regularly, another file selected by the user can be reproduced normally. A file having a hierarchical structure formed from video data and audio data both in the form of compressed data together with information necessary for processing of the video data and audio data is produced and recorded on a predetermined recording medium. Upon production of the file, information regarding decoding of the video data and audio data is disposed collectively on the top side of the file.

3 Claims, 31 Drawing Sheets

Related U.S. Application Data continuation of application No. 10/760,081, filed on Jan. 19, 2004, now Pat. No. 7,477,830.

(51) Int. Cl.
*H04N 5/935* (2006.01)
*H04N 21/854* (2011.01)

(58) Field of Classification Search
USPC .................................. 386/239–249
See application file for complete search history.

(56) References Cited

U.S. PATENT DOCUMENTS

| | | | |
|---|---|---|---|
| 6,253,025 | B1 | 6/2001 | Kitamura et al. |
| 6,411,575 | B1 | 6/2002 | Akiyama et al. |
| 6,430,723 | B2 | 8/2002 | Kodama et al. |
| 6,453,120 | B1 | 9/2002 | Takahashi et al. |
| 6,618,396 | B1 | 9/2003 | Kondo et al. |
| 6,871,205 | B1 | 3/2005 | Yamada et al. |
| 6,940,795 | B2 | 9/2005 | Fukushima et al. |
| 7,161,982 | B2 | 1/2007 | Kimoto |
| 7,215,620 | B2 | 5/2007 | Nishiuchi et al. |
| 7,251,277 | B2 | 7/2007 | Luken |
| 2002/0001348 | A1* | 1/2002 | Yiwen .................. H04N 5/4401 375/240.26 |
| 2002/0042834 | A1 | 4/2002 | Kremens et al. |
| 2003/0061369 | A1 | 3/2003 | Aksu et al. |
| 2003/0103073 | A1* | 6/2003 | Yokoyama .................... 345/716 |
| 2003/0138100 | A1 | 7/2003 | Ishizaka et al. |
| 2003/0147629 | A1 | 8/2003 | Kikuchi et al. |
| 2003/0161615 | A1 | 8/2003 | Tsumagari et al. |
| 2003/0182297 | A1 | 9/2003 | Murakami et al. |
| 2004/0109502 | A1 | 6/2004 | Luken |
| 2004/0218902 | A1* | 11/2004 | Yanagita ......................... 386/52 |
| 2004/0267821 | A1 | 12/2004 | Kiyama et al. |
| 2006/0265403 | A1* | 11/2006 | Mercer et al. .................. 707/10 |
| 2007/0140657 | A1 | 6/2007 | Ando et al. |

FOREIGN PATENT DOCUMENTS

| | | |
|---|---|---|
| JP | 6 149905 | 5/1994 |
| JP | 2000 39884 | 2/2000 |
| JP | 2001 338459 | 12/2001 |
| JP | 2002 7138 | 1/2002 |
| JP | 2002 281443 | 9/2002 |
| JP | 2003 219326 | 7/2003 |
| WO | WO 02 077865 | 10/2002 |
| WO | WO 02 085011 | 10/2002 |

OTHER PUBLICATIONS

Apple Computer, Inc., Inside Macintosh: Quick Time (Japanese Ed.), Addison-Wesley Publishing Co., Oct. 1993.

* cited by examiner

FIG. 9

| syntax | Size [bytes] |
|---|---|
| File Type Compatible Atom { | |
|   atom size | 4 |
|   atom type = ftyp | 4 |
|   Major Brand | 4 |
|   Minor Version | 4 |
|   /* Compatible Brand */ | |
|   for (i = 0; i < N; i++) { | |
|     Brand | 4 |
|   } | |
| } | |

FIG. 10

| syntax | Size [bytes] |
|---|---|
| Profile Atom { | |
|   atom size | 4 |
|   atom type = prfl | 4 |
|   Version | 1 |
|   flags | 3 |
|   feature-record-count | 4 |
|   /* feature-record-list */ | |
|   for (i = 0; i < feature-record-count; i++) { | |
|     track-ID | 4 |
|     sub-part-ID | 4 |
|     feature | 4 |
|     value | 4 |
|   } | |
| } | |

F I G. 11

| feature | MEANING | value (EXAMPLE) |
|---|---|---|
| cdty | TYPE OF CODEC | mp4v (MPEG4 video), mp4a (MPEG4 audio) |
| brat | BIT RATE OF DATA | 64000, 96000, 128000, 192000, 334000 [bps] |
| frat | VIDEO FRAME RATE | 10, 15, 24, 30 [fps] |
| srat | AUDIO SAMPLING FREQUENCY | 24000, 48000 [Hz] |
| wdth | VIDEO PICTURE SIZE (HORIZONTAL) | 176, 352, 704, 720 |
| hght | VIDEO PICTURE SIZE (VERTICAL) | 120, 144, 240, 288, 480, 576 |
| frty | FIXED FRAME OR VARIABLE FRAME | cfr (FIXED frame rate), vfr (VARIABLE frame rate) |
| brty | FIXED BIT RATE OR VARIABLE BIT RATE | cbr (FIXED bit rate), vbr (VARIABLE bit rate) |

FIG. 12 feature-record-list

| track-ID | sub-part-ID | feature | value |
|---|---|---|---|
| 1 | 1 | cdty | mp4v |
| 2 | 1 | cdty | mp4a |
| 1 | 1 | brat | 384000 |
| 2 | 1 | brat | 128000 |
| 1 | 1 | frat | 15 |
| 1 | 1 | wdth | 352 |
| 1 | 1 | hght | 288 |
| 2 | 1 | srat | 48000 |
| 1 | 1 | frty | cfr |
| 2 | 1 | brty | cbr |
| ...... | ...... | ...... | ...... | prfl

F I G. 16

| Entry No. | track -ID | sub-part -ID | Codec Type | REQUIRED SPECIFICATIONS ||||||
|---|---|---|---|---|---|---|---|---|---|
| | | | | bit rate | frame rate | PICTURE SIZE (HORIZONTAL) | PICTURE SIZE (VERTICAL) | sample rate | VARIABLE frame rate | VARIABLE bit rate |
| 1 | 1 | 1 | mp4v | 384000 | 15 | 352 | 288 | --- | No | --- |
| 2 | 2 | 1 | mp4a | 128000 | --- | --- | --- | 48000 | --- | No |
| --- | --- | --- | --- | --- | --- | --- | --- | --- | --- | --- |

F I G. 17

| Bit | SIGNIFICANCE OF bit field | VALUE (EXAMPLE) (BINARY NUMBER) | SIGNIFICANCE OF VALUE (EXAMPLE) |
|---|---|---|---|
| 31:26 | TYPE OF Video Codec | 001000<br>OTHERS | MPEG4 Video Simple Profile<br>reserved |
| 25:24 | frame rate CODE | 01<br>10<br>OTHERS | 10fps<br>15fps<br>reserved |
| 23 | variable frame rate FLAG | 0<br>1 | FIXED frame rate<br>VARIABLE frame rate |
| 22:20 | bit rate CODE | 010<br>100<br>110<br>OTHERS | 96kbps<br>192Kbps<br>384kbps<br>reserved |
| 19:16 | CODE OF PICTURE SIZE | 0111<br>1011<br>OTHERS | 176×44<br>352×288<br>reserved |
| 15:10 | TYPE OF Audio Codec | 010101<br>OTHERS | MPEG4 Audio AAC-LC<br>reserved |
| 9 | reserved | 0 | |
| 8 | variable bit rate FLAG | 0<br>1 | FIXED bit rate<br>VARIABLE bit rate |
| 7:4 | bit rate CODE | 0111<br>1001<br>OTHERS | 64kbps<br>128kbps<br>reserved |
| 3 | reserved | 0 | |
| 2:0 | sampling rate CODE | 010<br>101<br>OTHERS | 24kHz<br>48kHz<br>reserved |

FIG. 25

| value | SIGNIFICANCE |
|---|---|
| frmv | Fragmented Movie Atoms PRESENT |
| mdtk | TRACK FOR MODIFICATION |
| altk | TRACK FOR ALTERNATIVE |
| exrf | EXTERNAL REFERENCE PRESENT |
| sirf | SELF-CONTAINMENT PRESENT |
| cksz | chunk size atom PRESENT |

FIG. 26 feature-record-list

| track-ID | sub-part-ID | feature | value |
|---|---|---|---|
| 1 | 1 | tkst | slrf |
| 2 | 1 | tkst | exrf |
| 3 | 1 | tkst | mdtk |
| 4 | 1 | tkst | altk |
| 3 | 1 | tkst | exrf |
| 4 | 1 | tkst | exrf |
| 4 | 1 | tkst | slrf |
| --- | --- | --- | --- | prfl

FIG. 29

| Bit | feature=fnsc |
|---|---|
|  | SIGNIFICANCE OF EACH Bit (FLAG) |
| 31 | Fragmented Movie TYPE INCLUDED |
| 30:24 | reserved |
| 23 | TRACK WHICH MODIFIES MAIN VIDEO TRACK |
| 22 | TRACK WHICH MODIFIES MAIN AUDIO TRACK |
| 21 | ALTERNATIVE TRACK FOR MAIN VIDEO TRACK |
| 20 | ALTERNATIVE TRACK FOR MAIN AUDIO TRACK |
| 19 | MAIN VIDEO TRACK IN EXTERNAL REFERENCE TYPE |
| 18 | MAIN AUDIO TRACK IN EXTERNAL REFERENCE TYPE |
| 17 | Chunk Size Atom USED |
| 16:0 | reserved |

RECORDING APPARATUS, REPRODUCTION APPARATUS AND FILE MANAGEMENT METHOD

This is a continuation of application Ser. No. 12/189,957, filed. Aug. 12, 2008 now U.S. Pat. No. 8,224,156, which is a continuation of application Ser. No. 10/760,081, filed Jan. 19, 2004, now U.S. Pat. No. 7,477,830, having a claim of priority under 35 USC 119 to Japanese Application 2003-011995, filed in Japan on Jan. 21, 2003, the entirety thereof being incorporated herein by reference.

BACKGROUND OF THE INVENTION

This invention relates to a recording apparatus, a reproduction apparatus and a file managing method and can be applied to processing of movie files recorded, for example, in the QuickTime format.

Conventionally, video and music contents are compressed by encoding, and the compressed data are recorded on a recording medium. Then, data decompression is performed for the compressed data by processing of decoding corresponding to the encoding to provide decompressed data to the user.

Further, in the file format according to such video, and music contents, for example, the QuickTime is applied. In the QuickTime, a file structure and information regarding various files are defined by a hierarchical structure using Atom as a unit so that high extension performance can be assured.

In contrast, in a recording medium such as an optical disk for recording files regarding such contents, management information relating to a file managing system such as a file name, extension, recording position and so forth is retained in a predetermined management region. Consequently, in a computer and so forth, files which can be selected by an application program are selectively displayed based on the extension in accordance with the file managing system. Further, files desired by the user are reproduced with reference to the recording position by the file managing system.

In recent years, recording and reproduction apparatus which utilize such an optical disk as described above have exhibited a remarkable increase of the capacity. For example, Japanese Patent Laid-Open No. 2001-84705 (Patent Document 1) and No. 2002-278996 (Patent Document 2) disclose a method wherein data is extracted from a great number of files recorded on a recording medium to produce an index file and then the index file is utilized for selection of a file or the like. According to the method, a great number of files recorded on a recording medium can be managed readily.

Incidentally, in recent years, recording and reproduction apparatus such as a video recorder which uses an optical disk as a recording medium have been proposed. There is the possibility that, into such recording and reproduction apparatus, an optical disk used in a computer may be used. In this instance, there is the possibility that a file which is difficult to process may be recorded on the optical disk.

In this instance, a recording and reproduction apparatus of the type described may possibly use a method wherein a file formed in a file format which is difficult to process is excluded from a processing object with reference to the extension using management information relating to the file managing system. Further, in regard to exclusion of such a file as described above from a processing object, it is considered that there is a method wherein a user interface is provided such that such a file as described above cannot be found by the user so that an interface similar to that of a conventional video camera or the like which utilizes a magnetic tape can be provided.

However, while a file recorded by a computer in this manner has a format which can be processed in the discrimination of a format based on the extension, actually a case sometimes occurs wherein the file cannot be processed normally.

In particular, even if a codec for encoding contents is ready for a format which can be processed in consumer appliances, a case may occur wherein a file cannot be processed normally depending upon conditions upon encoding. Further, also a case may occur wherein a file cannot be processed normally depending upon a difference in performance between apparatus. In particular, a file cannot be processed at all or a reproduction image may temporarily freeze or temporarily miss.

Such situations as described above may occur also when an optical disk on which contents are recorded is reproduced by a consumer appliance of a similar type but having a different capacity.

In this instance, while the user believes that the optical disk can be reproduced and therefore issues an instruction for reproduction of the optical disk, the user does not find an error until the optical disk is actually reproduced. In this instance, remarkable displeasure is given to the user, and in an extreme case, the error causes the user to doubt failure of the apparatus. Further, in this instance, the user is urged to select a desired file once more, and also this gives displeasure to the user.

Particularly, since the format of the QuickTime has a high extendibility, there is the possibility that such situations as described above may frequently occur. Further, with regard to, for example, a storage system of data, the QuickTime includes an external reference type wherein an external file is referred to and a self inclusion type wherein data is stored into a file. Therefore, for example, where a recording and reproduction apparatus of the type described is not ready for the external reference type, a file of the external reference type cannot be processed at all.

It is to be noted that different computers naturally have different processing capacities from each other. Further, an application program is installed as occasion demands and besides is frequently subject to version up. Therefore, in the computer, the situations described above are permissible. However, in the recording and reproduction apparatus described above, the situations described above cannot be permitted at all.

SUMMARY OF THE INVENTION

It is an object of the present invention to provide a recording apparatus, a reproduction apparatus and a file management method wherein, even if one of files recorded on a recording medium cannot be reproduced normally, another file selected by the user can be reproduced normally.

In order to attain the object described above, according to the present invention, files are partially reproduced to acquire information regarding decoding thereof, and whether or not each of the files can be decoded normally is discriminated based on the information and then a table of the files is displayed based on the discrimination. Therefore, even if one of files recorded on a recording medium is difficult to process normally, another one of the files selected by the user can be processed normally.

In particular, according to an aspect of the present invention, there is provided a recording apparatus, including a file production element for producing a file having a hierarchical structure formed from video data and audio data both in the form of compressed data together with information necessary for processing of the video data and audio data, and a recording element for recording the file produced by the file production element on a predetermined recording medium, the file production element disposing information regarding decoding of the video data and audio data collectively on the top side of the file upon production of the file.

With the recording apparatus, upon formation of a file, at least information regarding decoding of video data and audio data is collectively disposed on the top side of the file. Consequently, the information regarding decoding can be partially reproduced to discriminate whether or not the file can be decoded normally. Therefore, it is possible to allow selection only of those files which can De decoded from among different files. Since only those files which can be decoded normally are presented for selection in this manner, even where one of files recorded on a recording medium is difficult to reproduce normally, another, one of the files selected by the user can be reproduced normally.

According to another aspect of the present; invention, there is provided a reproduction apparatus, including a reproduction element for reproducing a file recorded on a predetermined recording medium, a file processing element for separating, video data and audio data from the file reproduced by the reproduction element, and a decoding element for decoding the video data and audio data, the reproduction element partially reproducing files recorded on the recording medium to acquire information regarding decoding element set in the files, the file processing element discriminating whether or not each of the files can be decoded normally based on the information regarding the decoding element, the file production element displaying the files recorded on the recording medium in a table such that only those files which can be decoded normally can be selected.

With the reproduction apparatus, files recorded on a recording medium are partially reproduced to acquire information regarding decoding element set to the files, and it is discriminated based on the information regarding decoding element whether or not the files can be reproduced normally. Then, the files recorded on the recording medium area displayed in a table such that only those files which can be decoded normally can be selected. Consequently, even where one of the files recorded on the recording medium is difficult to reproduce normally, another one of the files selected by the user can be reproduced normally.

According to a further aspect of the present invention, there is provided a file managing method for managing files recorded on a recording medium, including the steps of partially reproducing the files recorded on the recording medium to acquire information regarding decoding of the files set in the files, discriminating whether or not each of the files can be decoded normally based on the information regarding the decoding, and displaying the files recorded on the recording medium in a table such that only those of the files which can be decoded normally can be selected.

With the file managing method, even where one of files recorded on a recording medium is difficult to reproduce normally, another one of the files selected by the user can be reproduced normally.

In summary, according to the present invention, files are partially reproduced to acquire information regarding decoding, and it is discriminated based on the information whether or not the files can be reproduced normally and a table of the files is displayed. Consequently, even where one of files recorded on a recording medium is difficult to process normally, another one of the files selected by the user can be processed normally.

The above and other objects, features and advantages of the present invention will become apparent from the following description, and the appended claims, taken in conjunction with the accompanying drawings in which like parts or elements denoted by like reference symbols.

BRIEF DESCRIPTION OF THE DRAWINGS

FIG. 9 is a diagrammatic view illustrating a file type compatibility atom in the QuickTime movie file illustrated in FIG. 8;

FIG. 10 is a diagrammatic view illustrating a profile atom in the QuickTime movie file illustrated in FIG. 8;

FIG. 11 is a diagrammatic view illustrating a setting of the profile atom illustrated in FIG. 10;

FIG. 12 is a diagrammatic view illustrating an example of the profile atom illustrated in FIG. 10;

FIG. 16 is a diagrammatic view illustrating a table used in the processing procedure illustrated in FIGS. 13 to 15;

FIG. 17 is a diagrammatic view illustrating a setting of a profile atom in a QuickTime movie file used in an optical disk apparatus according to a fourth embodiment of the present invention;

FIG. 25 is a diagrammatic view illustrating a setting of a profile atom for use with an optical disk apparatus according to a seventh embodiment of the present invention;

FIG. 26 is a diagrammatic view illustrating an example of the setting of the profile atom illustrated in FIG. 25;

FIG. 29 is a diagrammatic view illustrating a setting of a profile atom for use with an optical disk apparatus according to an eighth embodiment of the present invention;

DESCRIPTION OF THE PREFERRED EMBODIMENTS

In the following, several embodiments of the present invention are described in detail with reference to the drawings.

1. First Embodiment 1-1. Configuration of the First Embodiment

Figure 1:
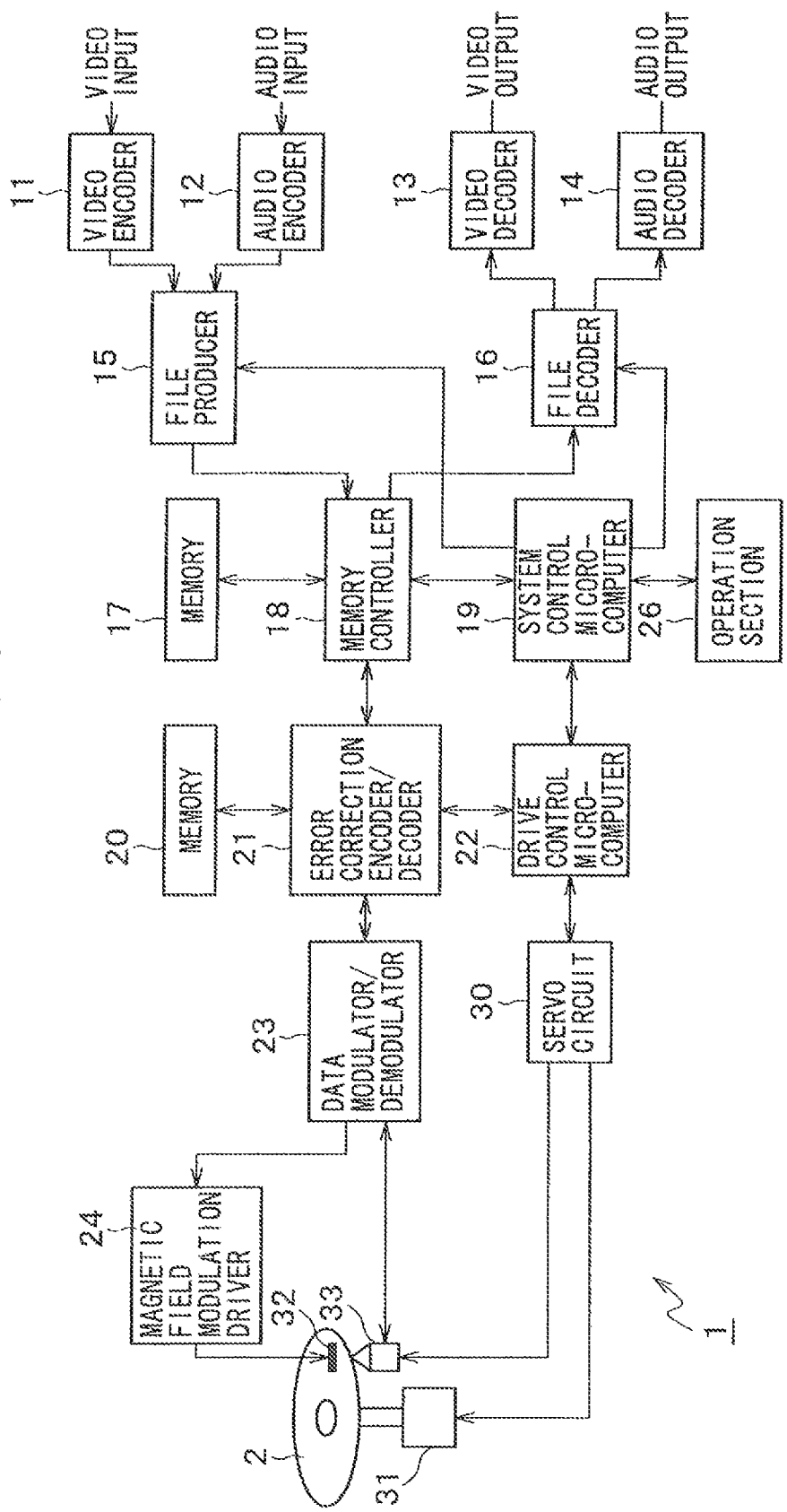
FIG. 1 is a block diagram showing an optical disk apparatus according to a first embodiment of the present invention.

FIG. 1 shows an optical disk apparatus according to a first embodiment of the present invention. The optical disk apparatus 1 acquires a video signal and an audio signal of an image pickup object by means of an image pickup section and a sound acquisition section not shown and records a result of image pickup as the video signal and audio signal on an optical disk 2. Further, the optical disk apparatus 1 reproduces the result of the image pickup recorded on the optical disk 2 and outputs it from a displaying section in the form of a liquid crystal display panel and a sound outputting section in the form of a speaker and further outputs it to an external equipment. The optical disk apparatus 1 converts such a video signal and an audio signal of the image pickup result into streaming data in accordance with a format of the MPEG (Moving Picture Experts Group) and then records the streaming data in accordance with a predetermined file format on the optical disk 2. In the present embodiment, the QuickTime is applied as the predetermined file format just described.

In the optical disk apparatus 1, a video encoder 11 performs an analog/digital conversion process for a video signal of a result of image pickup to produce, video data and then encodes the video data in accordance with the format of the MPEG. Consequently, an elementary stream of the video data is outputted from the video encoder 11.

An audio encoder 12 performs an analog/digital conversion process for an audio signal of a result of image pickup to produce audio data and then encodes the audio data in accordance with, the format of the MPEG. Consequently, an elementary stream of the audio data is outputted from the audio encoder 12.

A file production section 15 performs, upon recording, a multiplexing process for the elementary streams outputted from the video encoder 11 and the audio encoder 12 and produces a QuickTime movie file under the control of a system controlling microcomputer 19.

A memory controller 18 changes over operation thereof under the control of the system controlling microcomputer 19. Upon recording, the memory controller 18 successively records and temporarily retains a data, string of a QuickTime movie file outputted from the file production section 15 and various data outputted from the system controlling microcomputer 19 into a memory 17 and then outputs the retained data so as to be processed by a succeeding error correction encoding/decoding section 21. On the other hand, upon reproducing, the memory controller 18 temporarily retains output data from the error correction encoding/decoding section 21 and outputs the retained data to a file decoder 16 and the system controlling microcomputer 19.

The error correction encoding/decoding section 21 changes over operation thereof under the control of the system controlling microcomputer 19, and upon recording, temporarily records output data from the memory controller 18 into a memory 20 and adds an error correction code to the temporarily recorded data. Further, the error correction encoding/decoding section 21 reads out and outputs the data retained in the memory 20 in such a manner as just described in accordance with a predetermined order. Thereupon, the data are interleaved, and the interleaved data are outputted to a data modulation/demodulation section 23. On the other hand, upon reproduction, the error correction encoding/decoding section 21 temporarily records data outputted from the data modulation/demodulation section 23 into the memory 20 in accordance with a predetermined order and then outputs the data conversely to those upon recording. Thereupon, the error correction encoding/decoding section 21 performs a deinterleave process for the data outputted from the data modulation/demodulation section 23 and outputs the deinterleaved data to the memory controller 18. Further, at this time, the error correction encoding/decoding section 21 performs an error correction process with the error correction code added upon recording.

The data modulation/demodulation section 23 changes over operation thereof under the control of the system controlling microcomputer 19. Upon recording, the data modulation/demodulation section 23 converts output data from the error correction encoding/decoding section 21 into a serial data string and then performs a modulation process for the serial data string, and outputs the modulated serial data string to a magnetic field modulation driver 24 or an optical pickup 33. On the other hand, upon reproduction, the data modulation/demodulation section 23 reproduces a clock from a reproduction signal outputted from the optical pickup 33 and performs a binary identification process and a demodulation process for the reproduction signal with reference to the clock. Consequently, the data modulation/demodulation section 23 acquires reproduction data corresponding to the serial data string produced upon recording and outputs the reproduction data to the error correction encoding/decoding section 21.

Where a magneto-optical disk is used as the optical disk 2, upon recording, the magnetic modulation driver 24 drives a magnetic field head 32 with an output signal of the data modulation/demodulation section 23 under the control of the system controlling microcomputer 19. Here, the magnetic field head 32 is held so as to face the optical pickup 33 with the optical disk 2 interposed therebetween, and applies a modulation magnetic field based on the output data from the data modulation/demodulation section 23 to an irradiation position of a laser beam of the optical pickup 33. Consequently, in the optical, disk apparatus 1, where a magneto-optical disk is used as the optical disk 2, a QuickTime movie file and so forth are recorded on the optical disk 2 using a thermomagnetic recording method.

The optical disk 2 is a disk type recording medium. In the present embodiment, as the optical disk 2, a rewritable optical disk such as a magneto-optical disk (MO), a phase change type disk or the like is used. A spindle motor 31 drives the optical disk 2 to rotate in accordance with a condition such as a constant linear velocity (CLV), a constant angular velocity (CAV), a zone constant linear velocity or the like suitable for the optical disk 2 under the control of a servo circuit 30.

The servo, circuit 30 controls operation of the spindle motor 31 based on various signals outputted from the optical pickup 33 to perform a spindle controlling process. Further, the servo circuit 30 similarly controls the optical pickup 33 to perform a tracking control and a focusing control process, and further causes the optical pickup 33 and the magnetic field head 32 to perform seeking operation and executes a process such as a focus searching process.

A drive controlling microcomputer 22 controls operation of seeking and so forth of the servo circuit 30 in accordance with an instruction of the system controlling microcomputer 19.

The optical pickup 33 irradiates a laser beam upon the optical disk 2 and receives the reflected light by means of a predetermined light reception element, and then arithmetically operates a result of the light reception to produce various controlling signals. The optical pickup 33 outputs the controlling signals and further outputs a reproduction signal whose signal level varies in response to a pit string or a mark string formed on the optical disk 2. Further, the optical pickup 33 changes over operation thereof under the control of the system controlling microcomputer 19, and where the optical disk 2 is a magneto-optical disk, upon recording, the optical pickup 33 intermittently raises the luminous energy of the laser beam to be irradiated upon the optical disk 2. Consequently, in the optical disk apparatus 1, a QuickTime movie file or a like file is recorded onto the optical disk 2 by a pulse train system. On the other hand, where the optical disk 2 is a phase change type disk or the like, the optical pickup 33 raises the luminous energy of the laser beam to be irradiated upon the optical disk 2 from that upon reproduction to that upon writing. Consequently, a QuickTime movie file or the like is recorded on the optical disk by applying a thermal recording method.

The optical disk apparatus 1 compresses a video signal and an audio signal of a result of image pickup by means of the video encoder 11 and the audio encoder 12 to individually convert them into elementary streams and then converts the elementary streams into a QuickTime movie file by means of the file production section 15. Data of the QuickTime movie file is sent successively-through the memory controller 18, error correction encoding/decoding section 21 and data modulation/demodulation section 23 to the optical pickup 33. The data of the QuickTime movie file is recorded on the optical disk 2 by the optical pickup 33 or by the optical pickup 33 and the magnetic field head 32.

Further, the optical disk apparatus 1 processes a reproduction signal obtained by the optical pickup 33 by means of the data modulation/demodulation section 23 to obtain reproduction data and then processes the reproduction data by means of the error correction encoding/decoding section 21. Consequently, a QuickTime movie file and so forth recorded on the optical disk 2 can be reproduced, and the reproduced QuickTime movie file and so forth are outputted from the memory controller 18.

The file, decoder 16 receives data of the QuickTime movie file outputted from the memory controller 18, decomposes the data into elementary streams of video data and audio data, and outputs the elementary streams. A video decoder 13 decompresses the elementary stream of the video data and outputs the decompressed elementary stream to a display apparatus or external equipment not shown. An audio decoder 14 decomposes the elementary stream of the audio data outputted from, the file decoder 16 and outputs the decompressed elementary stream to a sound outputting apparatus or external equipment not shown. Consequently, in the optical disk apparatus 1, a result of image pickup reproduced from the optical disk 2 can be monitored.

An operation section 26 includes various operation elements of the optical disk apparatus 1 and a touch panel disposed on a liquid crystal display panel, and issues a notification of various operations by the user to the systems controlling microcomputer 19.

The system controlling microcomputer 19 controls operation of the entire optical disk apparatus 1. If loading of the optical disk 2 is detected through execution of a predetermined processing procedure recorded in a memory not shown, then the system controlling microcomputer 19 causes the optical pickup 33 to perform seeking operation to the innermost circumference and reproduce management information of a file managing system regarding the optical disk 2. Further, the system controlling microcomputer 19 acquires the reproduced management information from the memory controller 18 and stores it into a built-in memory. Consequently, the system controlling microcomputer 19 detects an address each file recorded on the optical disk 2 and a free region of the optical disk 2.

In particular, if an instruction to record an image pickup result is issued by the user, then the system controlling microcomputer 19 detects a free region in accordance with the management information retained in the memory and causes the optical pickup 33 to perform seeking operation to the free region, and records successively obtained image pickup results onto the optical disk 2. Further, the system, controlling microcomputer 19 updates the management information retained in the memory so as to correspond to records of a QuickTime movie file. Then, upon ejection of the optical disk 2 or the like, the system controlling microcomputer 19 updates the management information of the optical disk 2 in accordance with the updated management information. It is to be noted that the updating of the management information is executed by outputting the management information retained and updated in the memory to the error correction encoding/decoding section 21 through the memory controller 18.

On the other hand, if an instruction to reproduce a file recorded on the optical disk 2 is issued by the user, then the system controlling microcomputer 19 detects a recording position of a corresponding file in accordance with the management information retained in the memory and issues an instruction to reproduce the corresponding file based on a result of the detection.

In the reproduction process, the system controlling microcomputer 19 displays a table of the files recorded on the optical disk 2 and accepts an instruction for reproduction issued, by a selection operation of the user in the displayed table of the files.

Figure 2:
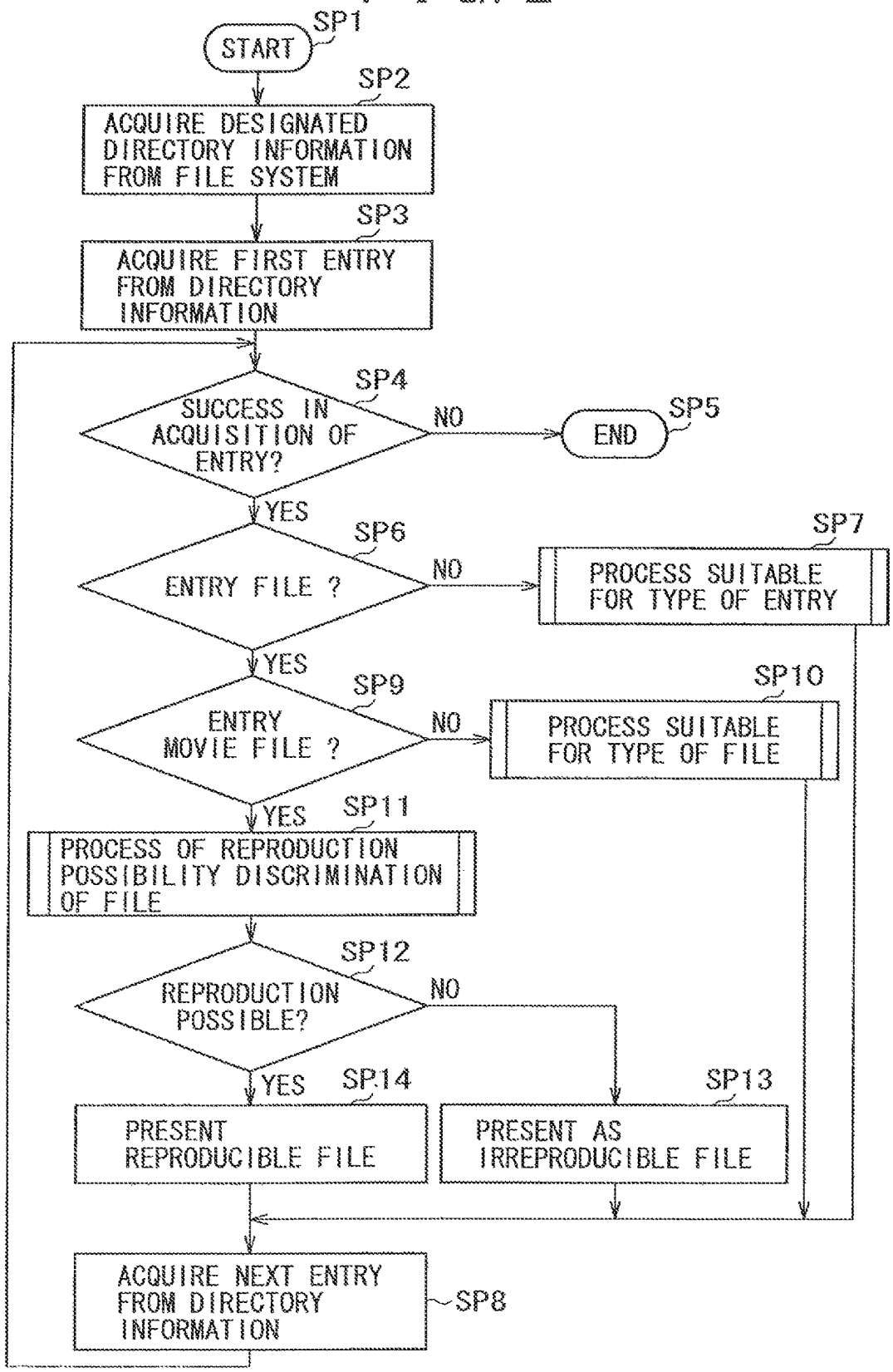
FIG. 2 is a flow chart illustrating a processing procedure of a system controlling microcomputer of the optical disk apparatus of FIG. 1.

In the reproduction-process, the system controlling microcomputer 19 executes a processing procedure illustrated in FIG. 2 to detect files which can be reproduced normally and display only the detected files in the form of a table. Consequently, in the present embodiment, even where files which are difficult to reproduce normally are recorded on the optical disk 2, a file selected by the user can be reproduced normally.

In particular, if an instruction to display a table is issued from the user, then the system controlling microcomputer 19 advances the processing from step SP1 to step SP2, at which it acquires directory information of a corresponding directory in accordance with management information regarding a file management system of the optical disk 2 stored in the memory. It is to be noted that the directory just described is, for example, a directory of favorite contents selected by the user, a root directory or the like, and directory information is formed from sub directories belonging to the directory, a set of entries of attribute information regarding files and so forth.

Then, the system controlling microcomputer 19 advances the processing to step SP3, at which it acquires information of one of entries from the directory information. Then, if acquisition of the information of the entry is difficult at step SP3 because, for example, a file or a sub folder is not registered in the folder of favorite contents designated by the user, then the processing advances from step SP4 to step SP5, at which the processing procedure is ended without displaying a table of files.

On the other hand, if it is discriminated at step SP4 that information of the entry is acquired successfully, then the processing advances to step SP6, at which it is discriminated whether or not information regarding a file is registered in the acquired entry. Here, if a negative result is obtained, then since this signifies, for example, that a file is not registered in the folder of favorite contents designated by the user, the processing advances from step SP6 to step SP7. At step SP7, a process corresponding to the type of the entry is executed, and then the processing advances to step SP8. It is to be noted that the process corresponding to the type of the entry is, for example, a process wherein, where the designation of the user is to display the favorite contents in a table display, favorite sub directories stored in the highest order directory relating to the favorite contents are set as a display object for a table display.

If the process corresponding to the entry is executed in this manner, then at next step SP8, the system controlling microcomputer 19 acquires a next entry from the information of the directory acquired, at step SP2 and returns the processing to step SP4.

On the other hand, if the entry is a file at step SP6, then since ah affirmative result is obtained, the system controlling microcomputer 19 advances the processing from step SP6 to step SP9. At, step SP9, the system controlling microcomputer 19 discriminates whether or not the file regarding the entry is a QuickTime movie file which is a file of a processing object in the optical disk apparatus 1 based on the extension of a corresponding file set in the entry. If a negative result is obtained at step SP9, then the system controlling microcomputer 19 advances the processing from step SP9 to step SP10, at which a process corresponding to the type of the file specified by the extension is executed, whereafter the processing advances to step SP8. It is to be noted that, in the process corresponding to the type of the file, for example, it may be further discriminated whether or not the file has compatibility with a QuickTime movie file, and if the file does not have compatibility with a QuickTime movie file, then the file may be eliminated from an object of a table display. However, if the file has compatibility with a QuickTime movie file, then a process following the processing procedure just described may be executed similarly as in the process regarding a QuickTime movie file.

On the other hand, if an affirmative result is obtained at step SP9, then the system controlling microcomputer 19 advances the processing from step SP9 to step SP11, at which it executes a reproduction possibility discrimination process of the file. Here, the reproduction possibility discrimination process of the file is a process wherein the corresponding file is partly reproduced from the optical disk 2 to acquire information regarding a decoding process set in the file and then it is discriminated based on the information regarding the decoding process whether or not the file can be decoded normally. Further, corresponding to the process just described, information regarding decoding and information regarding a file structure are allocated to the QuickTime movie file in a hierarchical structure formed from atoms. At step SP11, the system controlling microcomputer 19 discriminates whether or not the file of the entry can be reproduced normally, and at next step SP12, the system controlling microcomputer 19 discriminates whether or not a result of the discrimination that the file can be reproduced normally is obtained. Here, if a negative result is obtained, then the system controlling microcomputer 19 advances the processing from step SP12 to step SP13, at which it eliminates the file of the entry from an object of a table display, whereafter it advances the processing to step SP8.

On the other hand, if an affirmative result is obtained at step SP12, then the system controlling microcomputer 19 advances the processing from step SP12 to step SP14, at which it sets the file of the entry as a file which can be reproduced normally to a displaying object of a table display, whereafter it returns the processing to step SP8.

The system controlling microcomputer 19 successively detects those files which can be reproduced normally regarding the entries which, belong to the directory. Then, if the process for all of the files is completed, then since a negative result is obtained at step SP4, the processing now advances from step SP4 to step SP5, at which the files set as a displaying object are displayed as a table together with the folders of the sub directories and then the processing procedure is ended.

Figure 3:
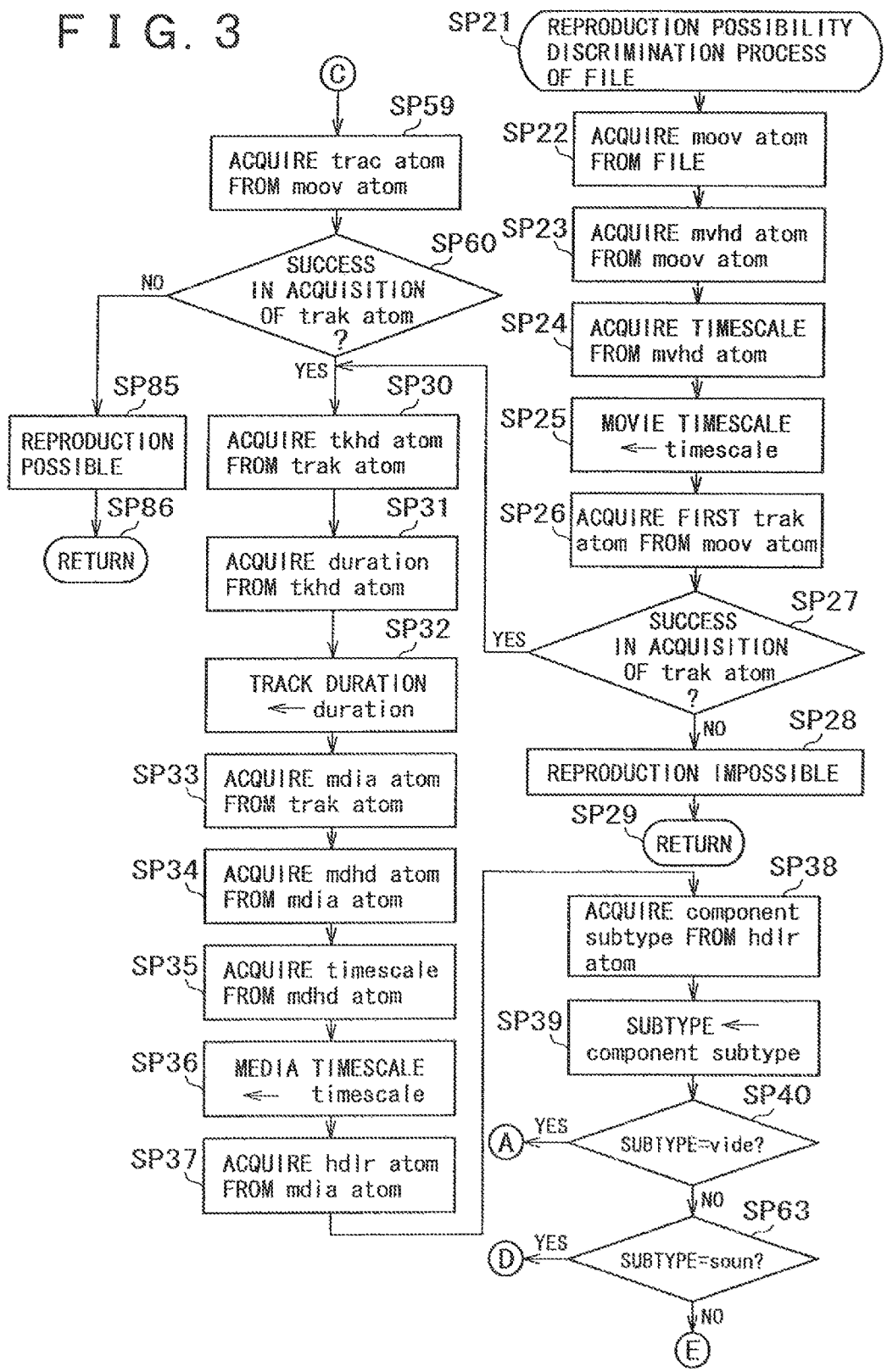
FIGS. 3 to 5 are flow charts illustrating a file reproduction possibility discrimination process of the processing procedure illustrated in FIG. 2.
Figure 4:
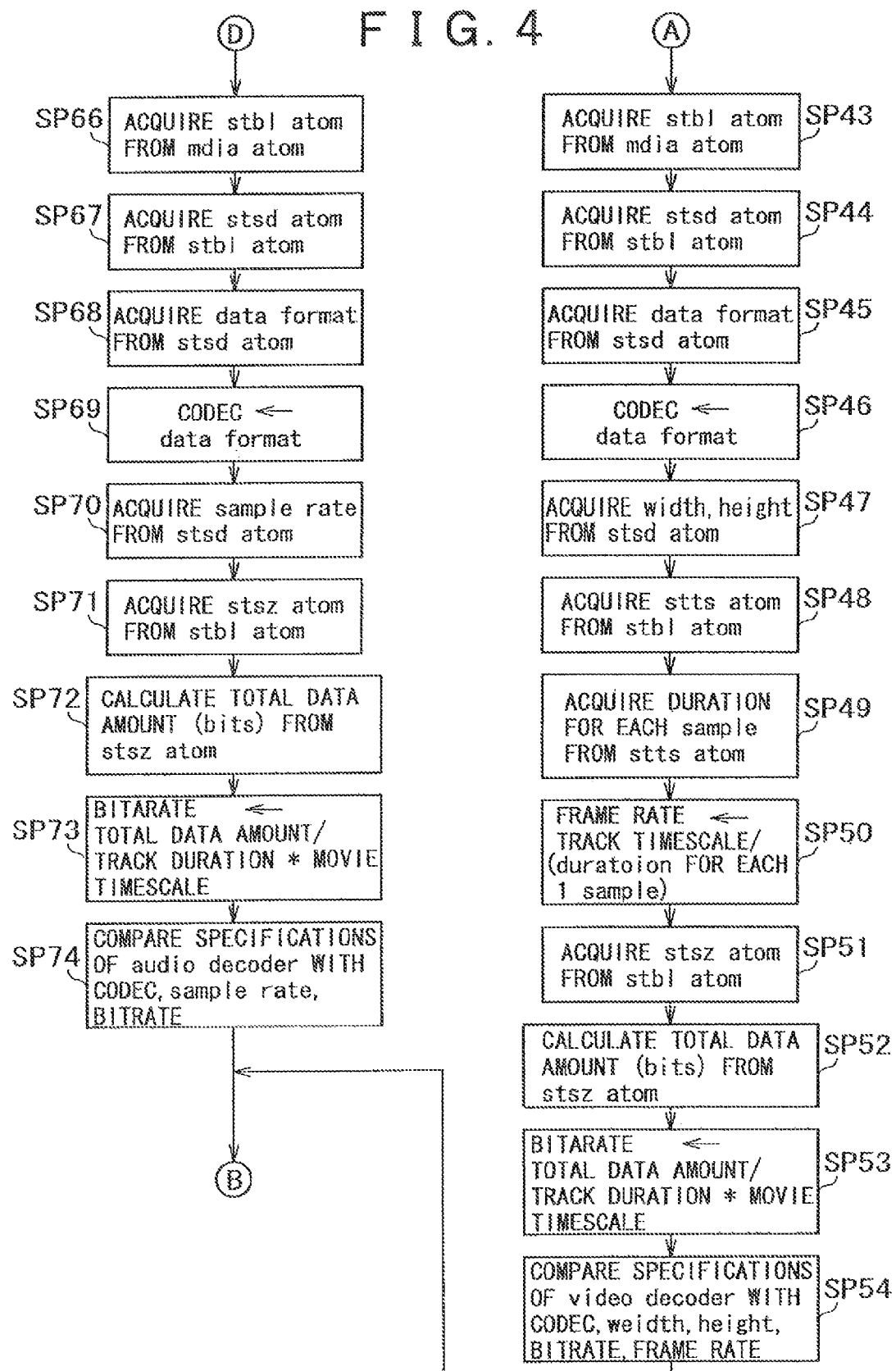
Figure 5:
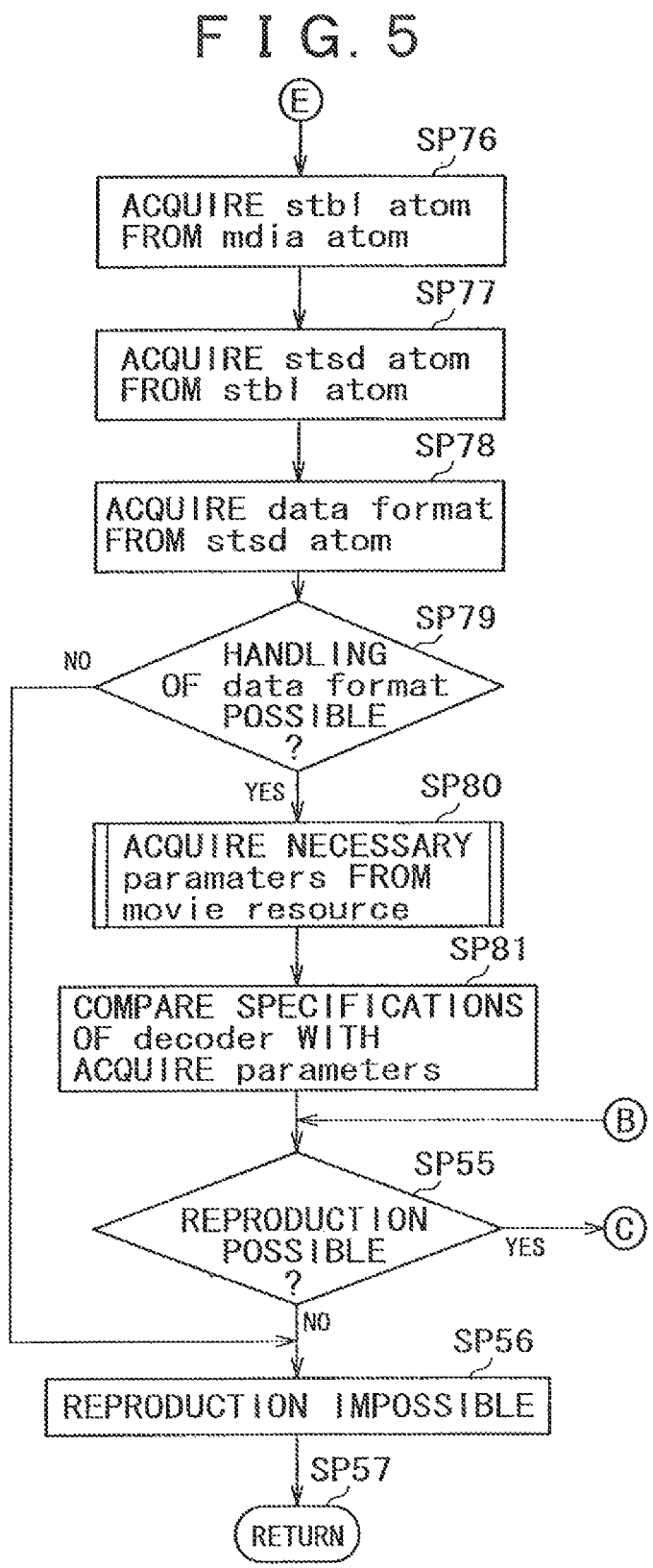

FIGS. 3 to 5 particularly illustrate the reproduction possibility discrimination process of a file executed at step SP11 in the processing procedure illustrated in FIG. 2. By executing the processing procedure illustrated in FIGS. 3 to 5, the system controlling microcomputer 19 partly reproduces a file which is a discrimination object from, the optical disk 2 and acquires information regarding decoding from the reproduced file and then discriminates whether or not the file can be reproduced normally.

In particular, after the processing procedure, is started, the system controlling microcomputer 19 advances the processing from step SP21 to step SP22. It is to be noted that, in the following description, a variable acquired from the file is represented by capital letters while the others are represented by lower-case letters as in the drawings. At step SP22, the system controlling microcomputer 19 issues an instruction for reproduction of the optical disk 2 based on recording position information included in the directory information acquired at step SP3 or step SP8 to reproduce part of the file of the entry and acquires a movie resource atom (moov atom) of the Quick-Time movie file through the file decoder 16.

At step SP23, the system controlling microcomputer 19 acquires a movie header atom (mvhd atom) from the acquired movie resource atom. Then at step SP24, the system controlling microcomputer 19 acquires a value of a timescale set in the movie header atom. Then at next step SP25, the system controlling microcomputer 19 stores the value acquired at step SP24 into the built-in memory.

At step SP26, the system controlling microcomputer 19 acquires a first track atom (trak atom) from the acquired movie resource atom, and then at step SP27, discriminates whether or not the track atom is acquired successfully. Here, if a negative result is obtained, then since this signifies that there is no track to make an object of reproduction in the file of a processing object, the processing advances from step SP27 to step SP28, at which the QuickTime movie file is set as a file which is difficult to reproduce normally. Then, the processing returns from step SP29 to the original processing procedure.

On the other hand, if an affirmative result is obtained at step SP27, then the system controlling microcomputer 19 advances the processing from step SP27 to step SP30. At step SP30, the system controlling microcomputer 19 acquires a media atom from the acquired track atom, and, at next step SP31, acquires a value of a duration set in the media atom. Then at next step SP32, the system controlling microcomputer 19 stores the acquired value of the duration into the built-in memory.

At step SP33, the system controlling microcomputer 19 acquires a media atom from the acquired track atom, and, at next step SP34, acquires a media header atom (mdhd atom) from the media atom. Then at next step SP35, the system controlling microcomputer 19 acquires a timescale set in the media header atom, and, at next step SP36, stores the timescale into the built-in memory.

Further, at step SP37, the system controlling microcomputer 19 acquires a media handler reference atom (hdlr atom) from the acquired media atom, and, at next step SP38, detects a setting of a component subtype set in the acquired media header reference atom. Then at step SP39, the system controlling microcomputer 19 records the detected component subtype in the memory, and thereafter, at step SP40, discriminates whether or not the value of the component, subtype indicates a video.

If an affirmative result is obtained at step SP40, then since this signifies that it is discriminated that the object track is a video track, the processing advances from step SP40 to step SP43. Referring now to FIG. 4, at step SP43, the system controlling microcomputer 19 acquires a sample table atom (stbl atom) from the acquired media atom, and at next step SP44, acquires a sample description atom (stsd atom) set in the sample table atom. Further, at step SP45, the system controlling microcomputer 19 acquires a data format which indicates a type of a codec from the sample description atom, and at next step SP46, stores the data format into the memory. Then at next step SP47, the system controlling microcomputer 19 acquires information (width) which indicates a size of a screen in the vertical direction and information (height) which indicates a size of the screen in the horizontal direction and then stores them into the memory.

At step SP48, the system controlling microcomputer 19 acquires a sample time atom (Sample to Time Atom: atts Atom) from the sample table atom, and at step SP49, acquires a duration of each sample from the sample time atom. At step SP50, the system controlling microcomputer 19 calculates a frame rate of the video data from the duration and the value of the timescale of the track and then stores a result of the calculation into the memory.

At step SP51, the system, controlling microcomputer 19 acquires a sample size atom (stsz atom) from the sample table atom, and then at step SP52, calculates the total amount of samples included in the video track based on data set in the sample size atom. At step SP53, the system controlling microcomputer 19 calculates a bit rate (BITRATE) of the track from the total amount of the samples, the duration stored in the memory at step SP32 and the timescale stored in the memory at step SP25 and then stores a result of the calculation into the memory.

Thus, the system controlling microcomputer 19 acquires information regarding decoding means of the optical disk apparatus 1 from the information regarding decoding set in the QuickTime movie file regarding the track of the QuickTime movie file. Then at step SP54, the system controlling microcomputer 19 compares the acquired information and specifications regarding the processing capacity of the video decoding section 13 with each other. In particular, the system controlling microcomputer 19 compares the data format which indicates the type of the codec acquired at step SP46, information (width) which indicates the size of the screen in the vertical direction acquired at step SP47, information (height) which indicates the size of the screen in the horizontal direction, frame rate detected at step SP50, and streaming data regarding the bit rate detected at step. SP53 with the processing capacity of the video decoding section 13.

Referring now to FIG. 5, at step SP55, the system controlling microcomputer 19 discriminates whether or not the track can be reproduced normally based, on a result of the comparison. Here, if a negative result is obtained, then the processing advances from step SP55 to step SP56, at which the QuickTime movie file is set as a file which is difficult to reproduce normally. Then, the processing returns from step SP57 to the original processing procedure.

On the other hand, if an affirmative result is obtained at step SP55, then the processing advances; from step SP55 to step SP59 illustrated in FIG. 3, at which the system controlling microcomputer 19 acquires a track atom (trak atom) regarding a next track from the movie resource atom. Then at step SP60, the system controlling microcomputer 19 discriminates whether or not a track atom is acquired successfully. Here, if an affirmative result is obtained, then the processing returns to step SP30, at which, for the track atom acquired at step SP59, a process similarly as in the case wherein an affirmative result is obtained at step SP27 is performed.

On the other hand, if a negative result is obtained at step SP40, then the system controlling microcomputer 19 advances the processing from step SP40 to step SP63, at which it discriminates whether or not the value of the component subtype is sound which indicates an audio track. Here, if an affirmative result is obtained, then the system controlling microcomputer 19 advances the processing from step SP63 to step SP66 (FIG. 3), at which it acquires a sample table atom (stbl atom) from the acquired media atom. Then at step SP67, the system controlling microcomputer 19 acquires a sample description atom (stsd atom) set in the sample table atom. At next step SP68, the system controlling microcomputer 19 acquires a data format which indicates a type of a codec from the sample description atom, and at step SP69, stores the data format into the memory. Then at step SP70, the system controlling microcomputer 19 acquires a sample rate of audio data from the sample description atom, and at step SP71, acquires a sample size atom (stsz atom) from the sample table atom. Thereafter, at step SP72, the system controlling microcomputer 19 calculates a total amount of samples included in the audio track based on the setting of the sample size atom.

At step SP73, the system controlling microcomputer 19 calculates a bit rate (BITRATE) of the track from the total amount of the samples, duration stored in the memory at step SP32, and timescale stored in the memory at step SP25, and stored a result of the calculation into the memory.

Thus, the system controlling microcomputer 19 acquires information regarding decoding means of the optical disk apparatus 1 from information regarding decoding set in the QuickTime movie file regarding the audio track of the QuickTime movie file. Then at step SP74, the system controlling microcomputer 19 compares the acquired information just described and specifications regarding the processing capacity of the audio decoder 14 with each other. In particular, the system controlling microcomputer 19 compares the data format which indicates the type, of the codec acquired at step SP69, sample rate acquired at step SP70, and bit rate calculated at step SP73 with the processing capacity of the audio decoder 14.

At next step SP55 illustrated in FIG. 5, the system controlling microcomputer 19 discriminates, based on the result of the comparison just described, whether or not the audio track can be reproduced normally. Also at this time, if the audio track is difficult to reproduce, then the system controlling microcomputer 19 executes the processes at step SP56 and SP57 and then returns the processing to the original processing procedure. If another result of the discrimination that the audio, track can be reproduced normally is obtained at step SP55, then the system controlling microcomputer 19 advances the processing from step SP55 to step SP59 (FIG. 3), at which it changes over the processing to that for a next track.

On the other hand, if a negative result is obtained at step SP63, then since the track in this instance is not a video track or an audio track, the system controlling microcomputer 19 advances the processing from step SP63 to step SP76. At step SP76, the system controlling microcomputer 19 acquires a sample table atom (stbl atom) from the acquired media atom. At step SP77, the system controlling microcomputer 19 acquires a sample description atom (stsd atom) set in the sample table atom. At step SP78, the system controlling microcomputer 19 acquires a data format which indicates a type of a codec from the sample description atom, and at step SP79, discriminates whether or not the data format can be processed.

Here, if a negative result is obtained, then the system controlling microcomputer 19 advances the processing from step SP79 to step SP56 and further to step SP57, at which it performs the individual processes. Thereafter, the processing returns from step SP57 to the original processing procedure. On the other hand, if ah affirmative result is obtained at step SP79, then the processing advances from step SP79 to step SP80. It is to be noted that the processing advances to step SP80 as just described in the case wherein the optical disk apparatus 1 has processing, means for media having a format of the QuickTime other than video data or audio data. At step SP80, the system controlling microcomputer 19 acquires information regarding decoding which is a discrimination material for discriminating whether or not the data format can be decoded normally by the processing means from the media atom. At step SP81, the system controlling microcomputer 19 compares the acquired information and the processing capacity of the other processing means with each other, and then advances the processing to step SP55. In this manner, the system controlling microcomputer 19 discriminates whether, or not the track can be reproduced normally, and if a result of the discrimination that the track cannot be reproduced normally is obtained also in this case, then the processes at steps SP56 and SP57 are executed and then the processing returns to the original processing procedure. On the other hand, if another result of the discrimination that the reproduction can be performed normally is obtained, then the system controlling microcomputer 19 advances the processing from step SP55 to step SP59 (FIG. 3), at which it changes over the processing to a next track.

Thus, the system controlling microcomputer 19 acquires information regarding decoding of the tracks set to the QuickTime movie file from the QuickTime movie file and discriminates whether or not they can be reproduced normally.

Further, where it is discriminated that all of the tracks can be reproduced normally, an affirmative result is obtained at step. SP60 (FIG. 3), and the processing advances from step SP60 to step SP85, at which the QuickTime movie file is set as a file which can be reproduced normally. Then the processing returns from step SP86 to the original processing procedure.

1-2. Operation of the First Embodiment

In the optical disk apparatus 1 (FIG. 1) having the configuration described above, video data acquired using an image pickup apparatus and audio data acquired using a sound acquisition apparatus are encoded by the video encoder 11 and the audio encoder 12, respectively. Then, the encoded data are converted into a data stream of a QuickTime movie file by the file production section 15. Thereafter, the data stream is recorded on the optical disk 2 through the recording system formed from the memory controller 18, error correction encoding/decoding section 21, data modulation/demodulation section 23, magnetic field modulation driver 24, and optical pickup 33. Consequently, in the optical disk apparatus 1, a result of the image pickup is recorded as a QuickTime movie file on the optical disk 2. Further, output data of the system controlling micro computer 19 is outputted to the recording system of the optical disk apparatus 1 so as to be ready for recording of the file on the optical disk 2. Consequently, the management information regarding the file management system of the optical disk 2 is updated so as to correspond to the record of the QuickTime movie file.

Such a QuickTime movie file recorded in such a manner as just described is successively reproduced based on the management information by the file management system through the optical pickup 33, data modulation/demodulation section 23, error correction encoding/decoding section 21, and memory controller 18. Then, the QuickTime movie file is divided into elementary streams of video data and audio data by the file decoder 16, and then the elementary streams are decoded and outputted from the video decoder 13 and the audio decoder 14, respectively.

In the optical disk apparatus 1 which performs recording and reproduction of results of image pickup, if the user issues an instruction for display in a table of the files recorded on the optical disk 2, then the optical disk apparatus 1 discriminates based on directory information which is the management information regarding the file management system of the optical disk 2 whether or not a file belonging to the directory for display in a table is a file of a processing object. Each file discriminated as a processing object file as just described is reproduced to discriminate based on information regarding decoding set in the file; whether or not the file can be reproduced normally. Then, only those files which can be reproduced normally are displayed as a table. Further, if the user selects a desired file from within the displayed table, then the corresponding file is reproduced.

Consequently, in the optical disk apparatus 1, since only the files which can be reproduced normally are selectively displayed, even if files which are difficult to reproduce normally are recorded on the optical disk 2 which is a recording medium, a file selected by the user can be reproduced normally.

1-3. Advantages of the First Embodiment

With the first embodiment having the configuration described above, only those files which are a reproduction object are selected based on management information regarding a file management system, and only those files which can be reproduced normally are selectively displayed based on information regarding decoding obtained by partly reproducing the selected files. Consequently, even if files which are difficult to reproduce normally are recorded on the optical disk 2 which is a recording medium, a file selected by the user can be reproduced normally.

2. Second Embodiment

Figure 6:
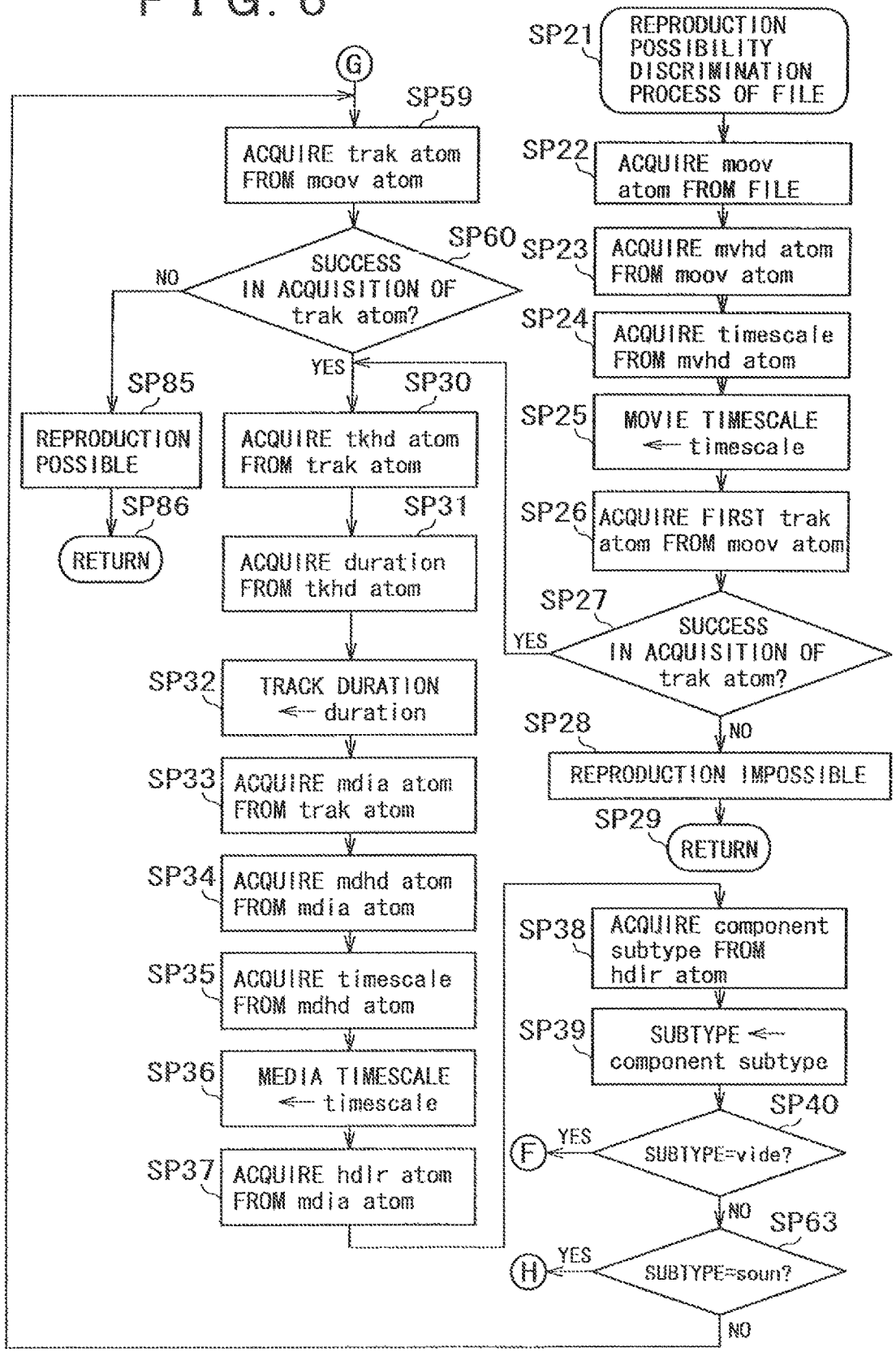
FIGS. 6 and 7 are flow charts illustrating a file reproduction possibility discrimination process of an optical disk apparatus according to a second embodiment of the present invention.
Figure 7:
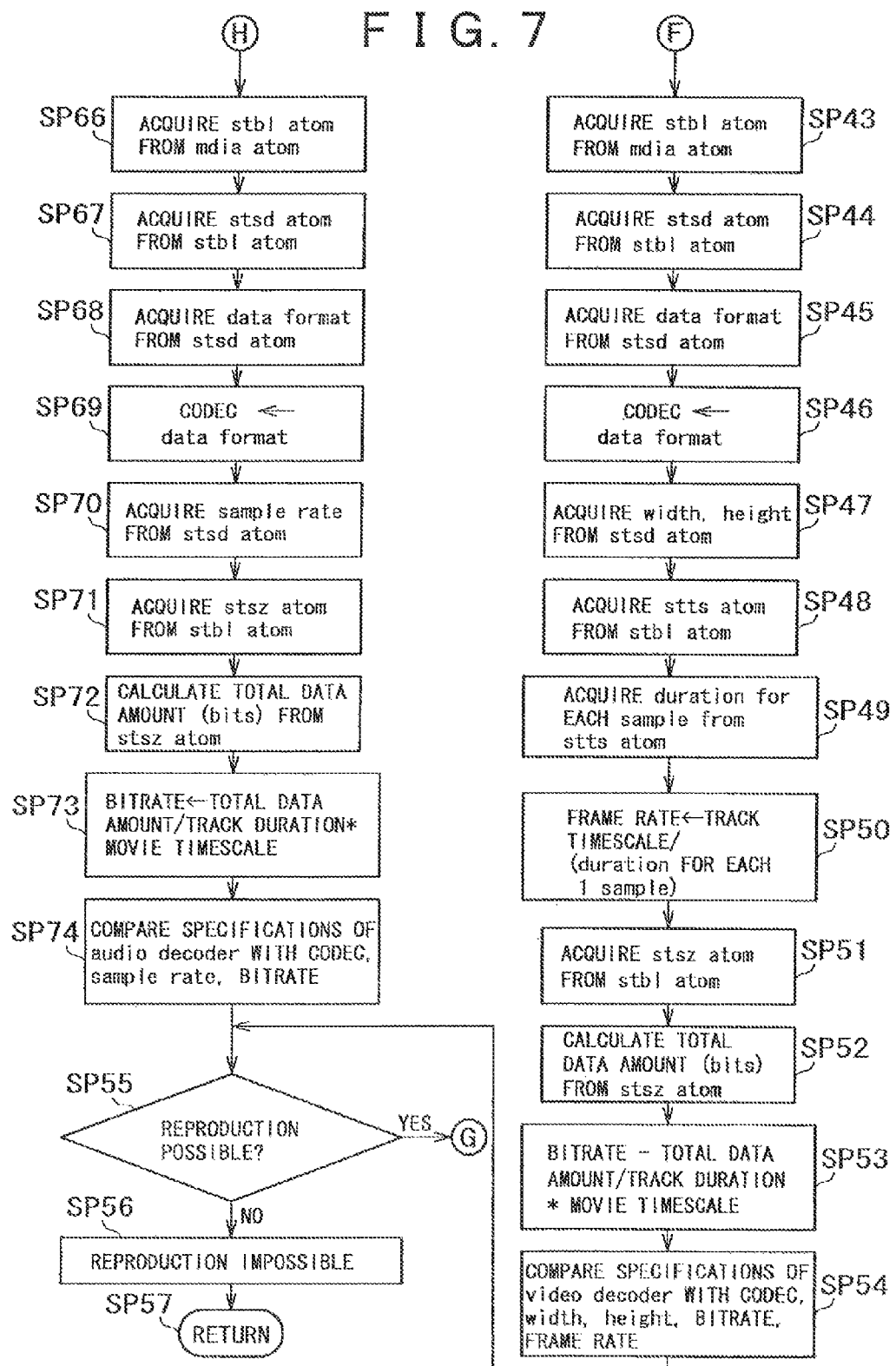

FIGS. 6 and 7 illustrate a processing procedure of a file reproduction possibility discrimination process according to a second embodiment. The present embodiment is configured similarly to the first embodiment except that the processing procedure illustrated in FIGS. 6 and 7 is executed in place of the processing procedure described hereinabove with reference to FIGS. 3 to 5. Further, in the processing procedure illustrated in FIGS. 6 and 7, like steps to those of the processing procedure described above with reference to FIGS. 3 to 5 are denoted by like reference characters, and overlapping description of them is omitted herein to avoid redundancy.

In the file reproduction possibility discrimination process, if a negative result is obtained at step SP63, then the system controlling microcomputer 19 returns the processing to step SP59. Consequently, the system controlling microcomputer 19 performs discrimination of whether or not reproduction can be performed normally only with regard to a video track and an audio track based on information regarding decoding.

Also where discrimination of whether or not reproduction can be performed normally is performed only with regard to a video track and an audio track based on information regarding decoding as in the present embodiment, similar advantages to those of the first embodiment can be achieved. Further, where, the discrimination of whether or not reproduction can be performed normally is performed only with regard to a video track and an audio track based on information regarding decoding in this manner, in the case of an application which reproduces only a video track and/or an audio track or another application wherein any other track than video tracks and audio tracks may be reproduced not precisely, similar advantages to those of the first embodiment can be achieved by a process simpler than that in the first embodiment.

3. Third Embodiment

Incidentally, where a file is finally reproduced partially to acquire information regarding decoding as in the first and second embodiments described above, considerable time is required for the discrimination of whether or not decoding of the file can be performed normally. Therefore, there is a drawback that time is required for display in a table as much and the convenience in use is deteriorated thereby.

Therefore, in the present embodiment, when a QuickTime movie file is produced by the file producer 15, information regarding decoding which is a material of discrimination of whether or not the QuickTime movie file can be reproduced normally is disposed collectively at a top portion of the TQ movie file using an atom for exclusive use. Further, it is discriminated based on the discrimination material disposed collectively in this manner whether or not the QuickTime movie file can be reproduced normally. In this connection, the present embodiment is configured similarly to the first embodiment except that the configuration of the QuickTime movie file is partly different. In the following, description is given suitably using the above-described configuration of the first embodiment. It is to be noted that such a discrimination material as described above need not necessarily be set when a QuickTime movie file is produced by the file producer 15, but may be provided, for example, in a file recorded on a optical disk 2 using some other apparatus to re-record the file including the discrimination material.

Figure 8:
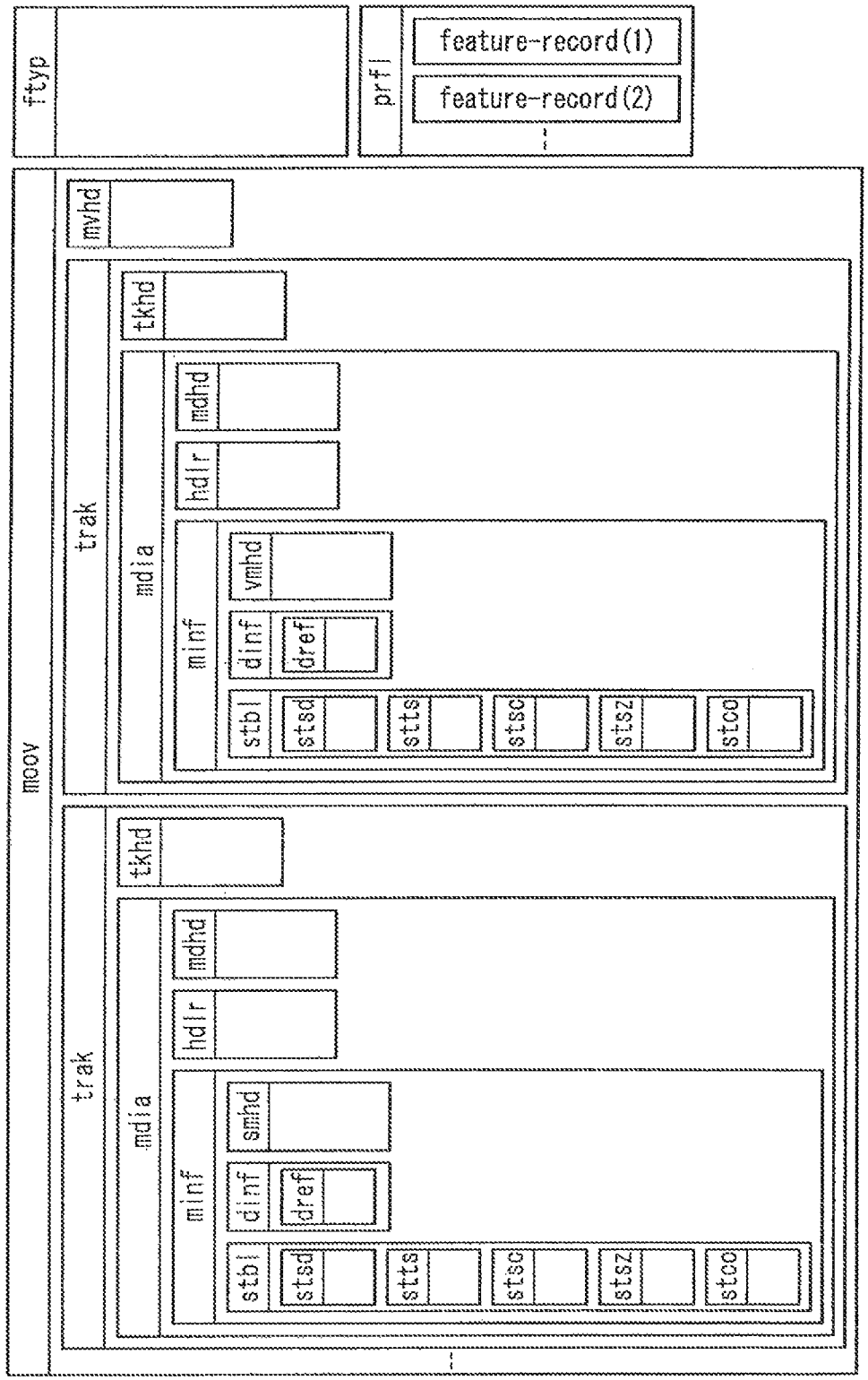
FIG. 8 is a diagrammatic view illustrating a QuickTime movie file for use with an optical disk apparatus according to a third embodiment of the present invention.

FIG. 8 illustrates a configuration of the movie atom (moov) side of a QuickTime movie file according to the present embodiment. Referring to FIG. 8, in the QuickTime movie file illustrated, a file type compatibility atom (ftyp) and a profile atom (prfl) are provided in a higher hierarchy with, respect to the movie atom (moov). In the QuickTime movie file, information necessary for discrimination of the specifications of the format of the QuickTime movie file is set to the format compatibility atom, and information regarding decoding is allocated to the profile atom.

Consequently, in the QuickTime movie file, a criterion regarding whether or not the QuickTime movie file can be reproduced normally is provided on the top side of the file. Consequently, the discrimination of whether or not the QuickTime movie file can be reproduced normally can be executed simply and rapidly as much.

FIG. 9 illustrates a configuration of the file type compatibility atom. In the file type compatibility atom, information (Size) representative of the size of the file type compatibility atom is allocated to the four top bytes. Further, information (Type) representing that the atom is a file type compatibility atom is allocated to the next four bytes. It is to be noted that ftyp is set to the information (Type).

In the file type compatibility atom, a major brand (Major-Brand) is registered in the further next 4 bytes. To the major brand (Major-Brand), an identifier for identification of the file format of the QuickTime movie file is set. Consequently, in the present embodiment, it is possible to discriminate based on the major brand (Major-Brand) whether or not the QuickTime movie file can be processed. It is to be noted that, in the present embodiment, the major brand is set, for example, to mqt.

To the following 4 bytes of the file type compatibility atom, a minor version (Minor-Version) is allocated. To the minor version (Minor-Version), a version of specifications relating to the QuickTime movie file in the major brand (Major-Brand) is allocated.

It is to be noted that the form of the minor version (Minor-Version) may differ among different specifications of the format indicated by the major brand (Major-Brand). Also, it is possible to partition the field of the minor version in a unit of 4 bits in accordance with the format of the major brand (Major-Brand) and place, for example, the version 1.3 as 0x00013000. In addition, an identifier of the producing person of the file and/or the application program may be placed in the minor version. It is to be noted that, in this instance, it is a possible idea, to use the most significant 8 bits as the integer part of the version number and use the succeeding 8 bits as the fractional part of the version number while the further succeeding 10 bits are used as the identifier of the producing person of the file and the last 6 bits are used as an identifier of the application with which the file is produced such that, for example, the version number 1.16, the identifier 0 of the file producing person and the identifier 1 of the application are represented as 0x01100001.

In the file type compatibility atom, a format (format compatible with the major brand (Major-Brand)) with which the QuickTime movie file can be reproduced and decoded is recorded in the form of repetitions of the compatibility brand (Compatible-Brand). In particular, for example, where the major brand is mqt, mqt and qt are placed in the compatibility brand. Consequently, in the present embodiment, it can be detected that, also where a compatible application program or the like is used, the file can be reproduced.

Meanwhile, a configuration of the profile atom is illustrated in FIG. 10. Referring to FIG. 10, to the profile atom, information (Size) indicative of the size of the profile atom and information (Type (in this instance, prfl is set)) indicating that the atom is a profile atom are set. Further, a version (Version), various flags (flags) and a count value (feature-recorded-count) are set, and furthermore, various kinds of information regarding decoding are recorded in the form of repetitions of a list (feature-record-list). The count value (feature-record-count) indicates the number of the lists.

The list (feature-record-list) includes a track ID (track-ID) for successively specifying track atoms, a sub part track ID (sub-track-ID) for specifying a sub part of a track, information (feature) indicative of a type of information regarding decoding, and corresponding actual data (value). To the information (feature) indicative of a type of information regarding decoding, various items such as a type of a codec, a bit rate of data and a frame rate of video data can be set as seen in FIG. 11. Further, corresponding to the items, actual data can be set in the items. It is to be noted that FIG. 12 illustrates an example of setting of information regarding decoding according to the list (feature-record-list). Referring to FIG. 12, in the example illustrated, it is indicated that, in the track whose track ID is 1, the codec is the MPEG (Moving Picture Experts Group) 4 video codec; the bit rate is 384,000 [bps]; the frame rate is 15 [fps]; the size of the screen is 3.52 pixels in the horizontal direction and 288 pixels in the vertical direction; and the frame rate is a fixed frame rate. Further, it is indicated that, in the track whose track ID is 2, the codec is the MPEG 4 audio codec; the bit rate is 128,000 [bps], the sampling frequency is 48,000 [Hz]; and the bit rate is a fixed rate.

Consequently, in the present embodiment, it can be discriminated based on the profile atom whether or not the QuickTime movie file can be produced without any trouble.

FIGS. 13 to 16 illustrate a preproduction possibility discrimination process of the system controlling microcomputer 19 where the QuickTime movie file having the configuration described hereinabove with reference to FIG. 8 is used. The system controlling microcomputer 19 uses the reproduction possibility discrimination process illustrated in FIGS. 13 to 16 in place of the file reproduction possibility discrimination process described hereinabove with reference to FIGS. 3 to 5 to discriminate whether or not a file can be reproduced normally. It is to be noted that the system controlling microcomputer 19 in the present embodiment discriminates, as a presupposition for the file reproduction possibility discrimination process, whether or not a file has a file format which can be reproduced based on directory information regarding a file management system of an optical disk 2 similarly as in the first embodiment.

Figure 13:
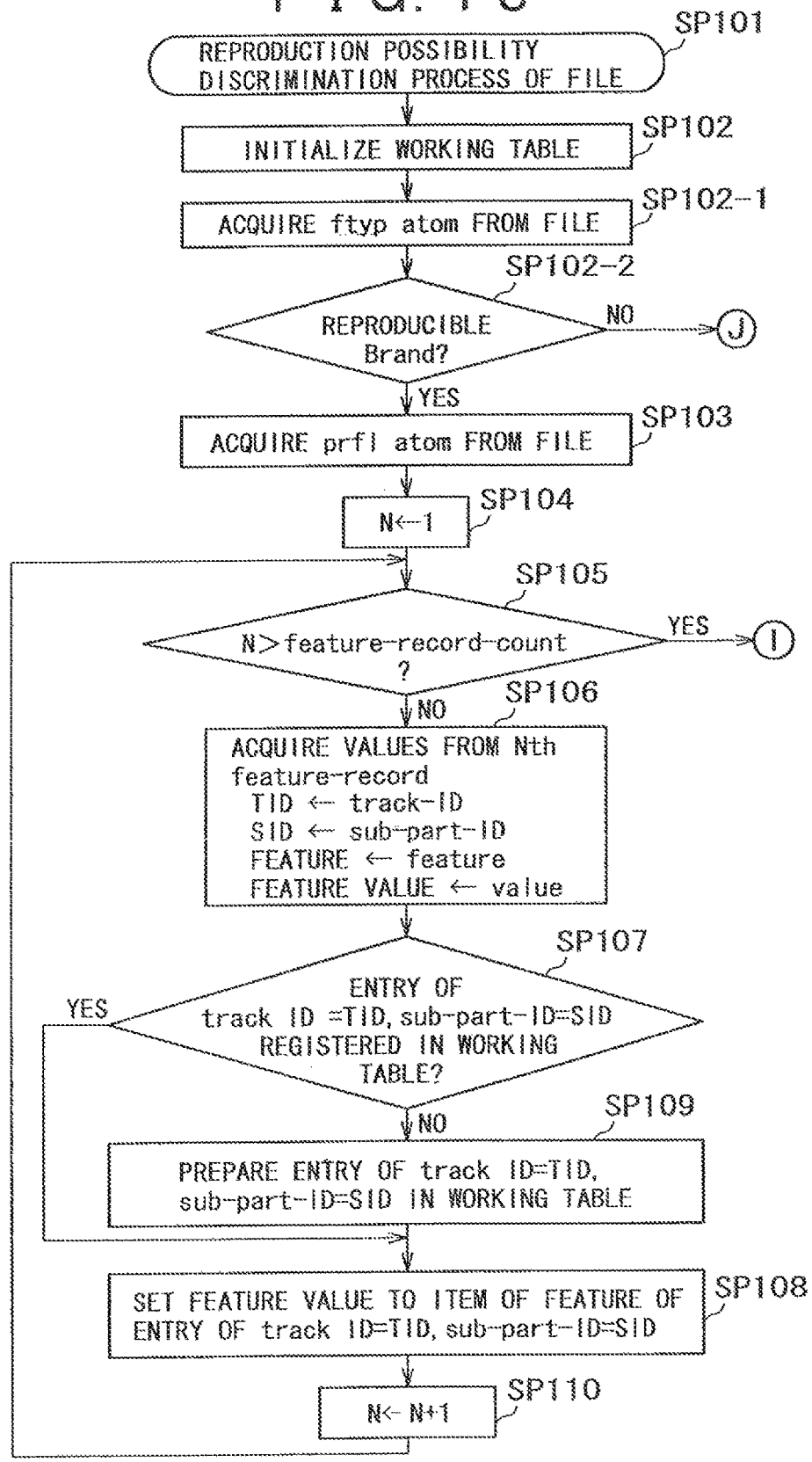
FIGS. 13 to 15 are flow charts illustrating a file reproduction possibility discrimination process of the optical disk apparatus according to the third embodiment of the present invention.

After the system controlling microcomputer 19 starts the processing procedure illustrated in FIG. 13, it advances the processing from step SP101 to step S102, at which it initializes a working table. The working table is illustrated in FIG. 16 and includes a collection of actual data of information regarding decoding in a unit of a track ID and a sub-part ID. The system controlling microcomputer 19 sets the track ID, sub-part ID and actual data of the table retained in the memory to default values to initialize the working table.

Referring back to FIG. 13, the system controlling microcomputer 19 acquires the file type compatibility atom from a QuickTime movie file at step S102-1. Then at, step SP102-2, the system controlling microcomputer 19 discriminates based on the major brand set in the file compatibility atom whether or not the format specifications adopted by the file can be reproduced. Then, if a result of the discrimination is that the reproduction is difficult, then the system controlling microcomputer 19 advances the processing to step SP114 (FIG. 15), at which it sets the file as an irreproducible file, whereafter it returns the processing to the original processing procedure through step SP115. On the other hand, if it is discriminated at step SP102-2 of FIG. 13 that the reproduction is possible, then the system controlling microcomputer 19 advances the processing to step SP103, at which it acquires the profile atom from the QuickTime movie file of the processing object. Then at step SP104, the system controlling microcomputer 19 sets a processing variable N corresponding to the count value (feature-record-count) set to the profile atom to the value 1.

Then at step SP105, the system controlling microcomputer 19 discriminates whether or not the value of the processing variable N is greater than the count value (feature-record-count) set to the profile atom. If a negative result is obtained, then the processing advances from step SP105 to step SP106, at which the system controlling microcomputer 19 acquires the track ID, sub-part ID, information (feature) indicative of the type of information regarding decoding and corresponding actual data (value) of the Nth list (feature-record-list) specified by the processing variable N. Then at step SP107, the system controlling microcomputer 19 discriminates whether or not actual data corresponding to the acquired track ID and sub-part ID is already registered in the working table. If such actual data is registered already, then the system controlling microcomputer 19 registers the actual data (value) in the column of the type (feature) acquired at step SP106 of a record in which the track ID and the sub-part ID are registered. On the other hand, if the track ID and the sub-part ID are not registered in the working table as yet, then the processing advances from step SP107 to step SP109, at which the system controlling microcomputer 19 produces a record of the track ID and the sub-part ID. Then at step SP108, the system controlling microcomputer 19 registers the actual data (value) into the column of the type (feature) of the produced record.

After the registration of the one list (feature-record-list) into the working table is completed in this manner, the system controlling microcomputer 19 increments the processing variable N by the value 1 at next step SP110 and then returns the processing to step SP105.

Consequently, the system controlling microcomputer 19 repeats the processing procedure. Then, when registration of all of the lists registered in the profile atom is completed, since an affirmative result is obtained at step SP105, the processing advances now from step SP105 to step SP111 (FIG. 14).

Figure 14:
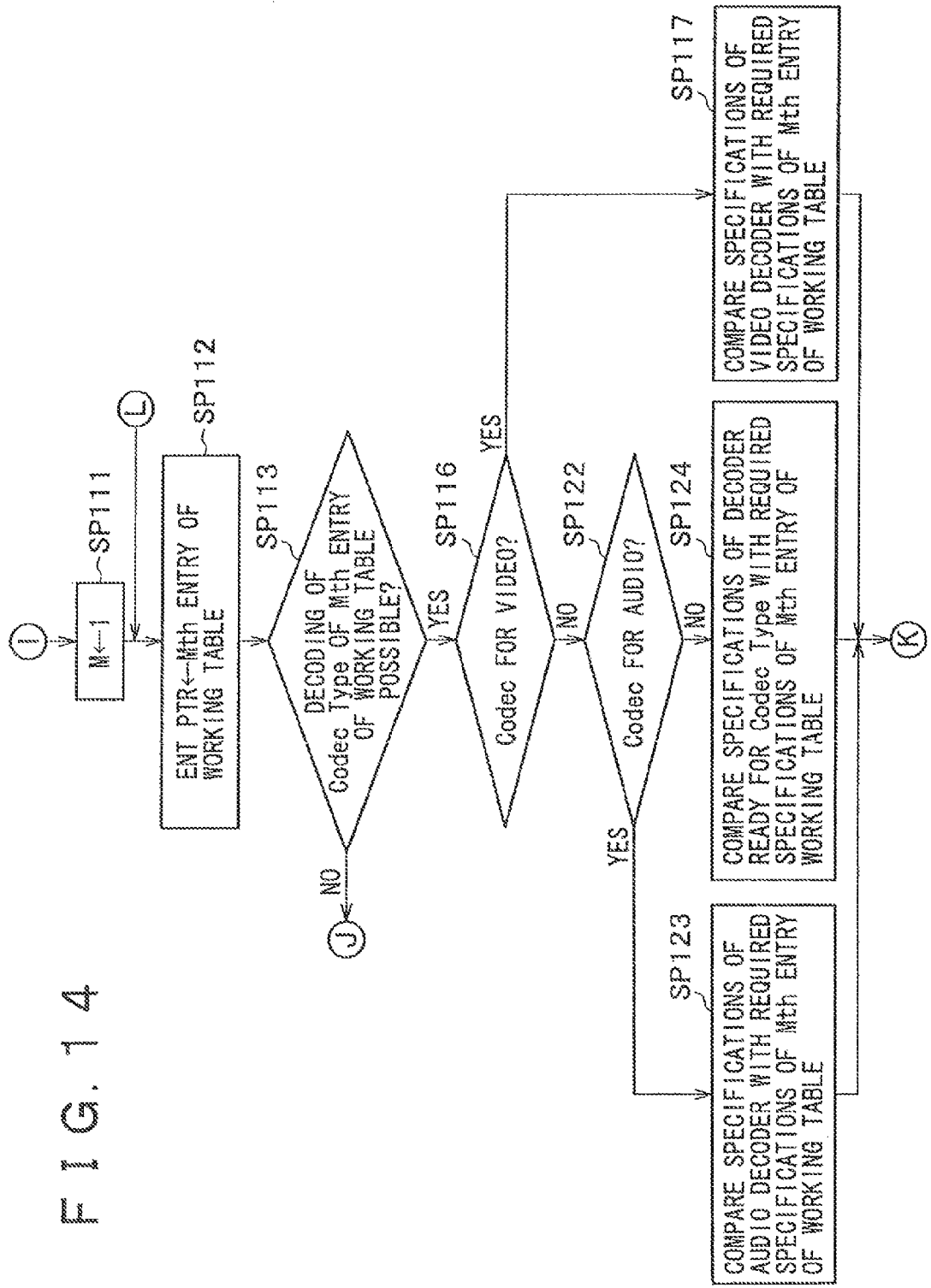
Figure 15:
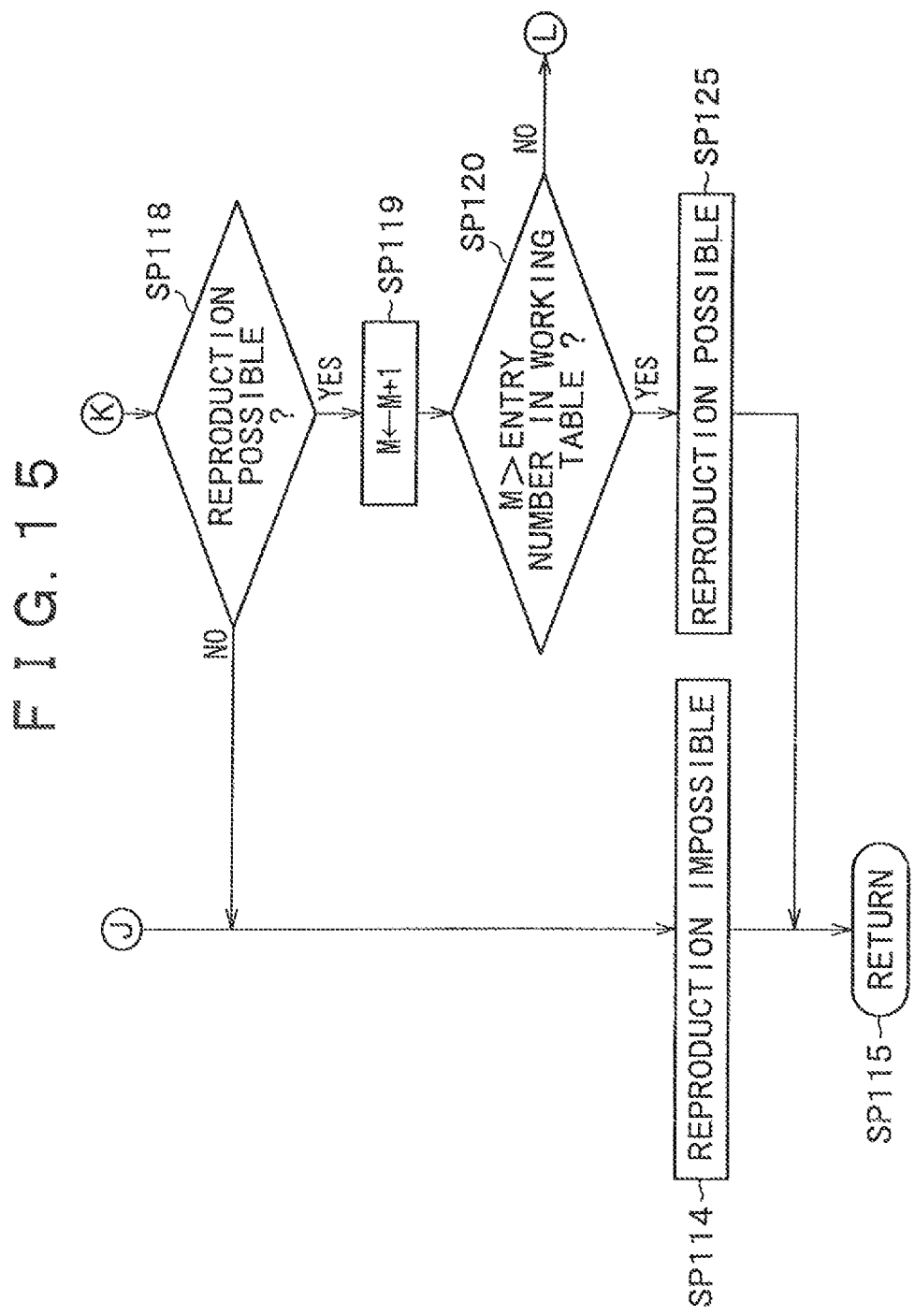

Referring to FIG. 14, at step SP111, the system controlling microcomputer 19 initializes a processing variable M to the value 1. The processing variable M is a variable corresponding to the number of records of the working table. After the processing variable M is set, the system controlling microcomputer 19 sets the Mth record of the working table designated by the value M of the processing variable M to the record of an object of discrimination. Then at step SP113, the system controlling microcomputer 19 discriminates based on the type of the codec set to the record of the discrimination object whether or not normal decoding is possible. If a negative-result is obtained, then the system controlling microcomputer 19 advances the processing from step SP113 to step SP114 (FIG. 15), at which it sets the QuickTime movie file to a file which is difficult to reproduce normally. Thereafter, the system controlling microcomputer 19 advances the processing to step SP115, at which it returns the processing to the original processing procedure.

On the other hand, if an affirmative result is obtained at step SP113 of FIG. 14, then the system controlling microcomputer 19 advances the processing from step SP113 to step SP116. At step SP116, the system controlling microcomputer 19 discriminates whether or not a condition for the record is recording of a video. If an affirmative result is obtained, then the processing advances from step SP116 to step SP117, at which the system controlling microcomputer 19 compares the recorded contents of the record and the capacity of the video decoder 13 with each other. Further, at step SP118 (FIG. 15), the system controlling microcomputer 19 discriminates based on a result of the comparison whether or not normal reproduction is possible. If a negative result is obtained, then the system controlling microcomputer 19 returns the processing to the original processing procedure through the steps SP114 and SP115. On the other hand, if it is discriminated at step SP118 that normal reproduction is possible, then the system controlling microcomputer 19 advances the processing from step SP118 to step SP119, at which it increments the processing variable M by the value 1, whereafter it advances the processing to step SP120. At step SP120, the system controlling microcomputer 19 discriminates whether or not the value of the processing variable M exceeds the number of records of the working table. If a negative result is obtained, then the processing returns to step SP111 (FIG. 14) so that the system controlling microcomputer 19 thereafter repeats a similar process for a next record.

On the other hand, if a negative result is obtained at step SP116, then the system controlling microcomputer 19 now advances the processing from step SP116 to step SP122, at which it discriminates whether or not the actual data of the record is for an audio. If an affirmative result is obtained, then the system controlling microcomputer 19 advances the processing from step SP122 to step SP123, at, which it compares, the recorded contents of the record and the capacity of the audio decoder 14 with each other. Further at step SP118 (FIG. 15), the system controlling microcomputer 19 discriminates based on a result of the comparison whether or not normal reproduction is possible, and thereafter, the system controlling microcomputer 19 executes such a series of processes as described above in response to a result of the discrimination.

On the other hand, if a negative result is obtained at step SP122, then the system controlling microcomputer 19 advances the processing now from step SP122 to step SP124. At step SP124, the system controlling microcomputer 19 compares the capacity of the decoder for the record and the recorded contents of the record with, each other. Then at step SP118 (FIG. 15), the system controlling microcomputer 19 discriminates based on a result of the discrimination whether or not normal reproduction is possible, and then executes a series of processes in accordance with a result of the discrimination.

Consequently, in the present embodiment, it is discriminated whether or not information regarding decoding set to a profile atom expanded in the working table can be reproduced normally in a unit of a track ID and a sub-part ID. Then, if a result of the discrimination that normal reproduction is possible is obtained with regard to all track IDs and sub-part IDs, then since an affirmative result is obtained at step SP120, the processing advances from step SP120 to step SP125, at which the QuickTime movie file is set as a normally reproducible file. Thereafter, the processing returns to the original processing procedure through step SP115.

According to the embodiment described above, information regarding decoding is recorded collectively at the top of a QuickTime movie file, and it is discriminated based on the information whether or not the QuickTime movie file can be reproduced normally. Consequently, the time required for the processing is reduced significantly, and similar advantages to those of the first and second embodiments can be anticipated, and the convenience in use of the user can be improved significantly as much.

4. Fourth Embodiment

FIG. 17 illustrates contents of the profile atom set to a QuickTime movie file according to the present embodiment. In the QuickTime movie file according to the present embodiment, contents illustrated in FIG. 17 are set in place of repetitions of the type (feature) of actual data and the actual data (value) of the profile atom having the contents illustrated in FIG. 11.

Particularly, in the present embodiment, pride is set to the information (feature) indicative of the type of actual data described hereinabove with reference to FIG. 11, and the actual data illustrated in FIG. 17 are placed in the actual data of the pride. Further, in the actual data (feature-record) wherein information (feature) representative of the type of the actual data is set to the pride, the track ID is set to 0 and an identifier same as the major brand of the file type compatibility atom is set to the sub-part ID in order to indicate that the list is not information regarding a particular track but is information regarding the entire QuickTime movie file. Consequently, in the profile atom, the actual data is encoded and disposed at a predetermined bit position to reduce the information (feature) indicative of the type of the actual data. Thus, the amount of data to be recorded on the optical disk 2 is reduced by an amount by which the information amount is reduced by the encoding of the actual data and further by an amount provided by elimination of repetitions of the track ID and sub-part ID.

Further, in the present embodiment, the setting of the code is performed such that the greater side in value of corresponding actual data corresponds to the greater side in value of a code representation. For example, in a code of a sampling rate by the top 3 bits, a code of a value 101 is set to the frequency 48 [kHz] while another code of another value 010 lower than the value 101 is set to the frequency 24 [kHz] lower than the frequency 48 [kHz]. Consequently, in the present embodiment, a relationship in magnitude of various conditions in decoding can be grasped roughly depending upon the setting of the code.

Figure 18:
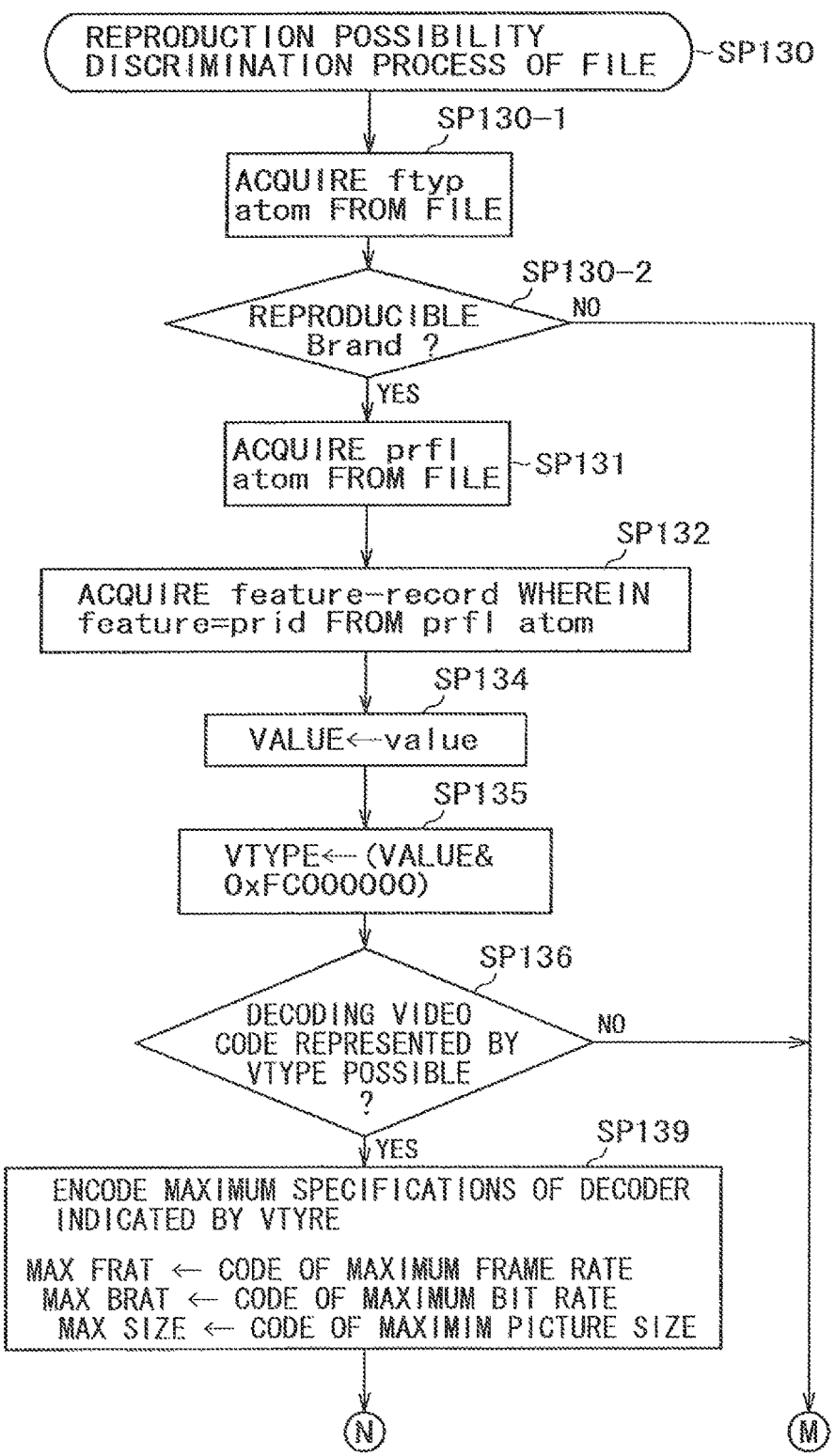
FIGS. 18 to 20 are flow charts illustrating a file reproduction possibility discrimination process of the optical disk apparatus according to the fourth embodiment of the present invention.
Figure 19:
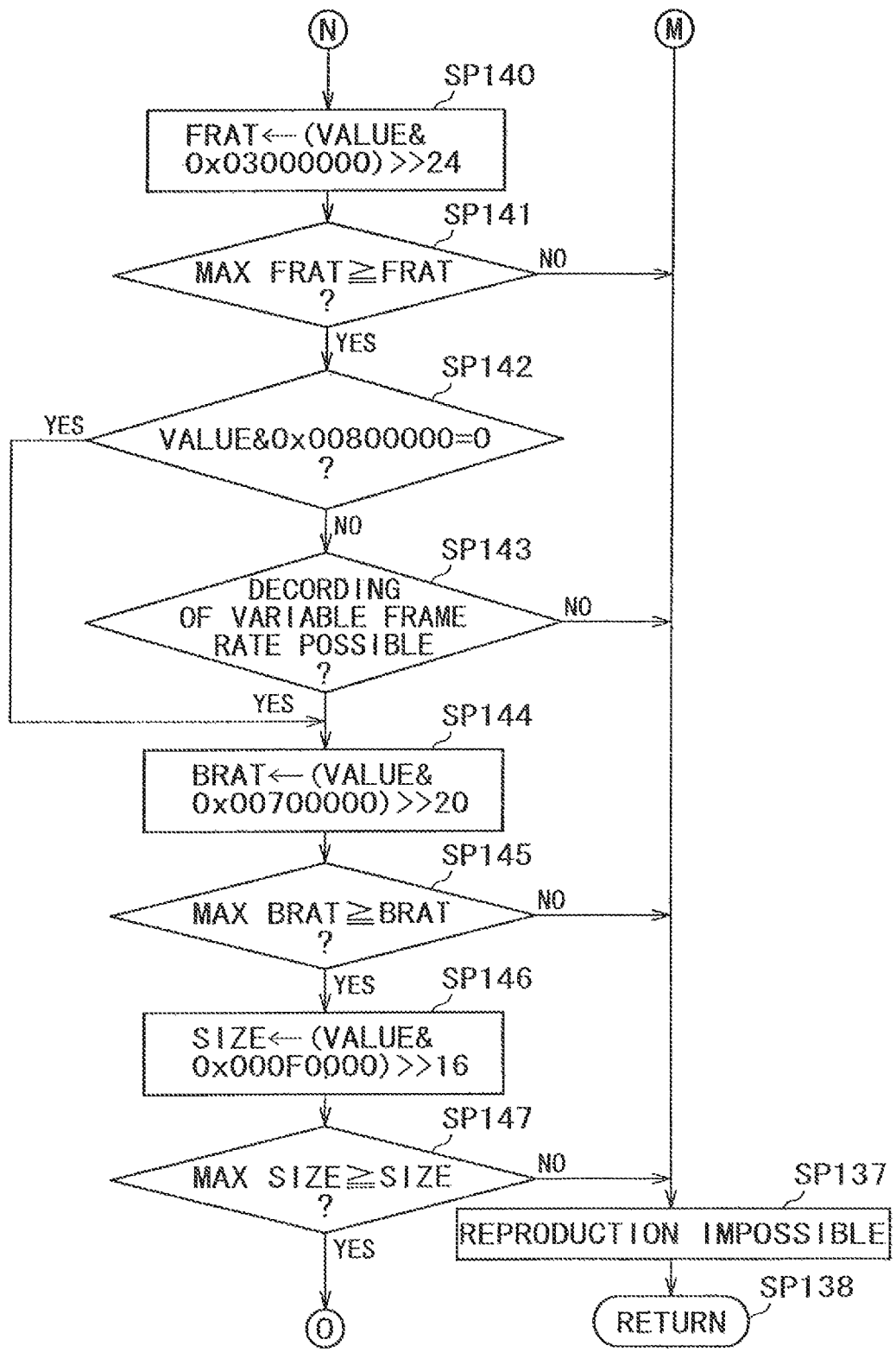
Figure 20:
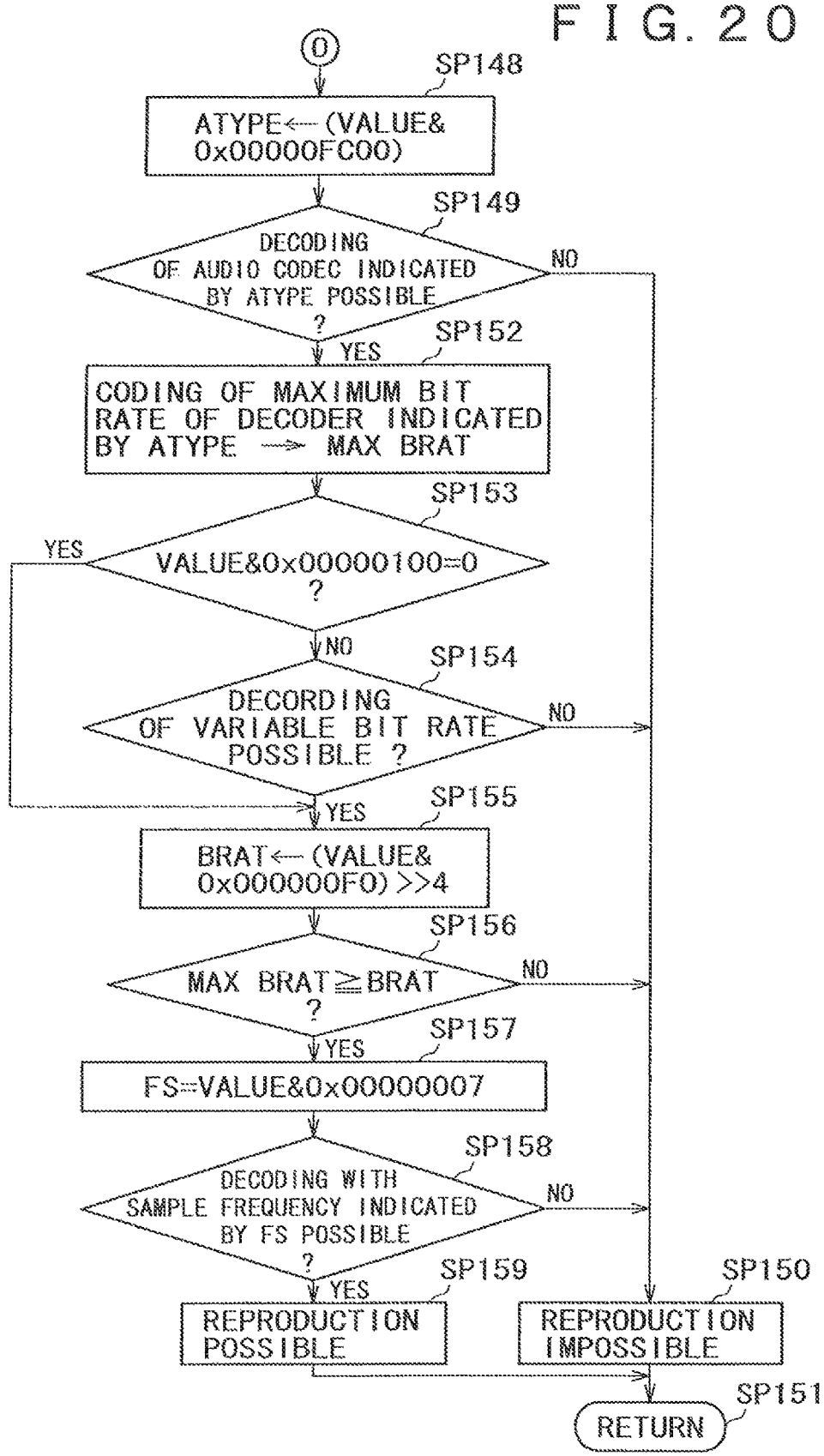

FIGS. 18 to 20 illustrate a file reproduction possibility discrimination process of the system controlling microcomputer where the profile atom in the present embodiment is used. The system controlling microcomputer in the present embodiment executes the processing procedure of FIGS. 18 to 20 in place of the processing procedure of FIGS. 13 to 16.

Referring first to FIG. 18, after the system controlling microcomputer starts the processing procedure, it advances the processing from step SP130 to step SP130-1, at which it acquires the file type compatibility atom from a QuickTime movie file of a processing object. Then at step SP130-2, the system controlling microcomputer discriminates based on the major brand set to the file type compatibility atom whether or not the format specifications adopted by the file can be reproduced. If a discrimination result that the reproduction is difficult is obtained, then the processing advances to step SP137 (FIG. 19), at which the system controlling microcomputer sets the file as an irreproducible file, whereafter it returns the processing to the original processing procedure through step SP138. On the other hand, if another discrimination result that the reproduction is possible is obtained, then the processing now advances to step SP131 of FIG. 18, at which the system controlling microcomputer acquires the profile atom from the QuickTime movie file of the object of processing. Then at step SP132, the system controlling microcomputer acquires actual data (feature-record) described hereinabove with reference to FIG. 17 from the acquired profile atom. Then at step SP134, the system controlling microcomputer places the acquired actual data into a processing variable (VALUE).

At step SP135, the system controlling microcomputer extracts a cord type portion (high order 6 bits) regarding video data from the variable (VALUE), and then at step SP136, discriminates based on the value of the extracted code type whether or not decoding is possible. If a negative result is obtained, then the system controlling microcomputer advances the processing from step SP136 to step SP137 (FIG. 19), at which it sets the QuickTime movie file as a file which is difficult to reproduce normally, whereafter it returns the processing to the original processing procedure through step SP138.

On the other hand, if an affirmative result is obtained at step SP136 of FIG. 18, then the system controlling microcomputer advances the processing from step SP136 to step SP139. At step SP139, the system controlling microcomputer encodes maximum specifications of the video decoder 13 of the optical disk apparatus 1 so as to correspond to the variable (VALUE) to set codes of a maximum frame rate (MAX FRAT), a maximum bit rate (MAX BRAT) and a maximum picture size (MAX SIZE). Further at step SP140, the system controlling microcomputer extracts a code portion of the frame rate from the variable (VALUE), and then at step SP141, compares the extracted code portion with the code of the maximum frame rate (MAX FRAT) set at step SP139. If a result of discrimination that the capacity of the optical disk apparatus 1 is insufficient is obtained through the comparison, then the system controlling microcomputer returns the processing from step SP141 to step SP137, at which it sets the QuickTime movie file as a file which is difficult to reproduce normally. Thereafter, the system controlling microcomputer returns the processing to the original processing procedure through step SP138.

On the other hand, if it is discriminates at step SP141 that the optical disk apparatus 1 has a sufficient capacity, then the system controlling microcomputer advances the processing to step SP142, at which it discriminates whether or not the flag of the variable (VALUE) indicative of the variable bit rate of video data is in a set state. If the flag indicative of the variable bit rate is in a set state, then the system controlling microcomputer advances the processing to step SP143, at which it discriminates whether or not the optical disk apparatus 1 is ready for the variable bit rate. If a negative result is obtained, then the system controlling microcomputer advances the processing from step SP143 to step S137, at which it sets the QuickTime movie file as a normally irreproducible file. Thereafter, the system controlling microcomputer returns the processing to the original processing procedure through step SP138.

On the other hand, if an affirmative result is obtained at step SP143, or if a discrimination result that the flag indicative of the variable bit rate is not in a set state is obtained at step SP142, then the system controlling microcomputer extracts a code portion of the bit rate from the variable (VALUE) at step SP144. Then at step SP145, the system controlling microcomputer compares the extracted code portion with the code of the maximum bit rate (MAX BRAT) set at step SP139. Then, if a discrimination result that the capacity of the optical disk apparatus 1 is insufficient is obtained by the comparison, then the system controlling microcomputer advances the processing from step SP145 to step SP137, at which it sets the QuickTime movie file as a file which is difficult to reproduce normally. Thereafter, the system controlling microcomputer returns the processing to the original processing procedure through step SP138.

On the other hand, if another discrimination result that the capacity of the optical disk apparatus 1 is sufficient is obtained at step SP145, then the system controlling, microcomputer advances the processing to step SP146, at which, it extracts a code portion of the maximum picture size from the variable (VALUE). Then at step SP147, the system controlling microcomputer compares the extracted code portion with the code (MAX SIZE) of the maximum picture size set at step SP139. If a discrimination result that the capacity of the optical disk apparatus 1 is insufficient is obtained by the comparison, then the system controlling microcomputer advances the processing from step SP147 to step SP137, at which it sets the QuickTime movie file as a file which is difficult to reproduce normally. Thereafter, the system controlling microcomputer returns the processing to the original processing procedure through step SP138.

In contrast, if another discrimination result that the capacity of the optical disk apparatus 1 is sufficient is obtained at step SP147, then the system controlling microcomputer advances the processing to step SP148 (FIG. 20), at which it extracts a code type portion regarding audio data from the variable (VALUE). Then at step SP149, the system controlling microcomputer discriminates based on the value of the extracted code type whether or not decoding is possible. If a negative result is obtained, then the system controlling microcomputer advances the processing from step SP149 to step 150, at which it sets the QuickTime movie file as a file which is difficult to reproduce normally, whereafter it returns the processing to the original processing procedure through step SP151.

On the other hand, if another discrimination result that decoding is possible is obtained a step SP149, then the system controlling microcomputer returns the processing to step SP152, at which it encodes the maximum specifications of the audio decoder 14 so as to correspond to the variable (VALUE) thereby to set a maximum bit rate (MAX BRAT). Then at step SP153, the system controlling microcomputer discriminates the setting of the flag indicative of the variable bit rate of the audio in the variable (VALUE). If the flag indicative of the variable bit rate is in a set state, then the processing advances to step SP154, at which the system controlling microcomputer discriminates whether or not the optical disk apparatus 1 is ready for the variable bit rate. If a negative result is obtained, then the system controlling microcomputer advances the processing from step SP154 to step SP150, at which it sets the QuickTime movie file as a file which is difficult to reproduce normally, whereafter it returns the processing to the original processing procedure through step SP151.

On the other hand, if an affirmative result is obtained at step SP154, or if a discrimination result that the flag indicative of the variable bit rate is not in a set state is obtained at step SP153, then the system controlling microcomputer extracts a code portion of the bit rate regarding audio data from the variable (VALUE). Then at step SP156, the system controlling microcomputer compares the extracted code, portion with the code of the maximum bit rate (MAX BRAT) set at step SP152. If a discrimination result that the capacity of the optical disk apparatus 1 is insufficient is obtained by the comparison, then the system controlling microcomputer advances the processing from step SP156 to step SP150, at which it sets the QuickTime movie file as a file which is difficult to reproduce normally. Thereafter, the system controlling microcomputer returns the processing to the original processing procedure through step SP151.

On the other hand, if another discrimination result that the capacity of the optical disk apparatus 1 is sufficient is obtained at step SP156, then the system controlling microcomputer advances the processing to step SP157, at which it extracts a code portion of the sampling frequency regarding audio data from the variable (VALUE). Then at step SP158, the system controlling microcomputer discriminates whether or not decoding is possible with the sampling frequency indicated by the extracted code portion. If a negative result is obtained, then the system controlling microcomputer advances the processing from step SP158 to step SP150, at which it sets the QuickTime movie file as a file which is difficult to reproduce normally. Thereafter, the system controlling microcomputer returns the processing to the original processing procedure through step SP151.

On the other hand, if an affirmative result is obtained at step SP158, then the processing advances from step SP158 to step SP159, at which the system controlling microcomputer sets the QuickTime movie file as a normally reproducible file, whereafter it returns the processing to the original processing procedure through step SP151.

Consequently, in the present embodiment, advantages similar to those of the third embodiment can be anticipated eliminating an increase of the data amount of a QuickTime movie file effectively. Actually, while, according to the configuration of the third embodiment, only the list (feature-record-list) requires 160 bytes, according to the present embodiment, the information of 160 bytes can be represented with 16 bytes.

5. Fifth Embodiment

Figure 21:
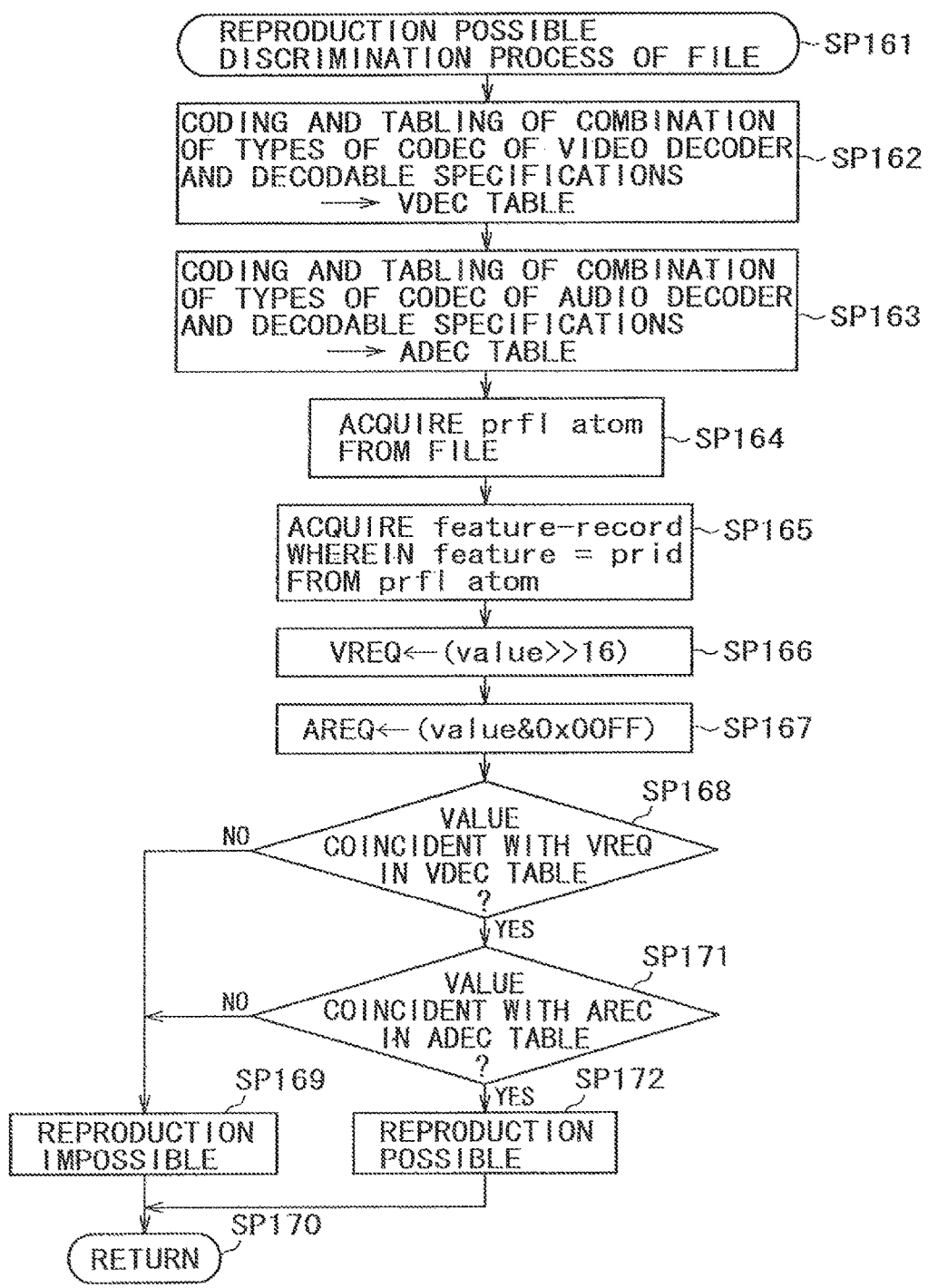
FIG. 21 is a flow chart illustrating a file reproduction possibility discrimination process of an optical disk apparatus according to a fifth embodiment of the present invention.

FIG. 21 illustrates a file reproduction possibility discrimination process according to a fifth embodiment of the present invention. The present embodiment is configured similarly to the fourth embodiment except that the processing procedure illustrated in FIG. 21 is applied in place of the file reproduction possibility discrimination process described hereinabove with reference to FIGS. 18 to 20.

In particular, in the present embodiment, after the system controlling microcomputer starts the processing procedure, the processing advances from step SP161 to step SP162. At step SP162, the system controlling microcomputer encodes combinations of different types of a codec which can decode video data and specifications in the optical disk apparatus 1 so as to correspond to codes (FIG. 17) set to the QuickTime movie file to form a table (VDEC TABLE) for criteria.

Then at step SP163, the system controlling microcomputer encodes combinations of different types of a codec which can decode audio data and specifications in the optical disk apparatus 1 similarly to form a table (ADEC TABLE) for criteria.

Then at step SP164, the system controlling microcomputer acquires the profile atom of the QuickTime movie file, and then at step SP165, acquires actual data (feature-record) described with reference to FIG. 17 from the acquired profile atom. Further, at step SP166, the system controlling microcomputer cuts out a code portion (VREQ) corresponding to the table (VDEC TABLE) for criteria regarding video data from the acquired actual data. Further at step SP167, the system controlling microcomputer cuts out a code portion (AREQ) corresponding to the table (ADEC TABLE) for criteria regarding audio data from the acquired actual data similarly.

Then at step SP168, the system controlling microcomputer compares the code portion (VREQ) regarding video data cut out in such a manner as just described with the table (VDEC TABLE) for criteria regarding video data to discriminate whether or not the optical disk, apparatus 1 has a sufficient capacity for processing of video data. If a discrimination result that the capacity of the optical disk apparatus 1 is insufficient is obtained by the comparison, then the system controlling microcomputer advances the processing from step SP168 to step SP169, at which it sets the QuickTime movie file as a file which is difficult to reproduce normally. Thereafter, the system controlling microcomputer returns the processing to the original processing procedure though step SP170.

On the other hand, if another discrimination result that the capacity of the optical disk apparatus 1 is sufficient is obtained at step SP168, then the system controlling microcomputer advances the processing to step SP171. At step SP171, the system controlling microcomputer compares the code portion (AREQ) regarding audio data cut out at step SP167 with the table (ADEC TABLE) for criteria regarding audio data to discriminate whether or not the capacity of the optical disk apparatus 1 for processing of audio data is sufficient. If a discrimination result that the capacity of the optical disk apparatus 1 is insufficient is obtained by the comparison, then the system controlling microcomputer advances the processing from step SP171 to step SP169, at which it sets the QuickTime movie file as a file which is difficult to reproduce normally. Thereafter, the system controlling microcomputer returns the processing to the original processing procedure through step SP170.

On the other hand, if an affirmative result is obtained at step SP171, then the processing advances from step SP171 to step SP172, at which the system controlling microcomputer sets the QuickTime movie file as a normally reproducible file. Thereafter, the system controlling microcomputer returns the processing to the original processing procedure through step SP170.

Consequently, with the present embodiment, whether or not normal reproduction is possible is discriminated by a further simple process than with the fourth embodiment. Thus, advantages similar to those achieved by the fourth embodiment can be anticipated.

6. Sixth Embodiment

Figure 22:
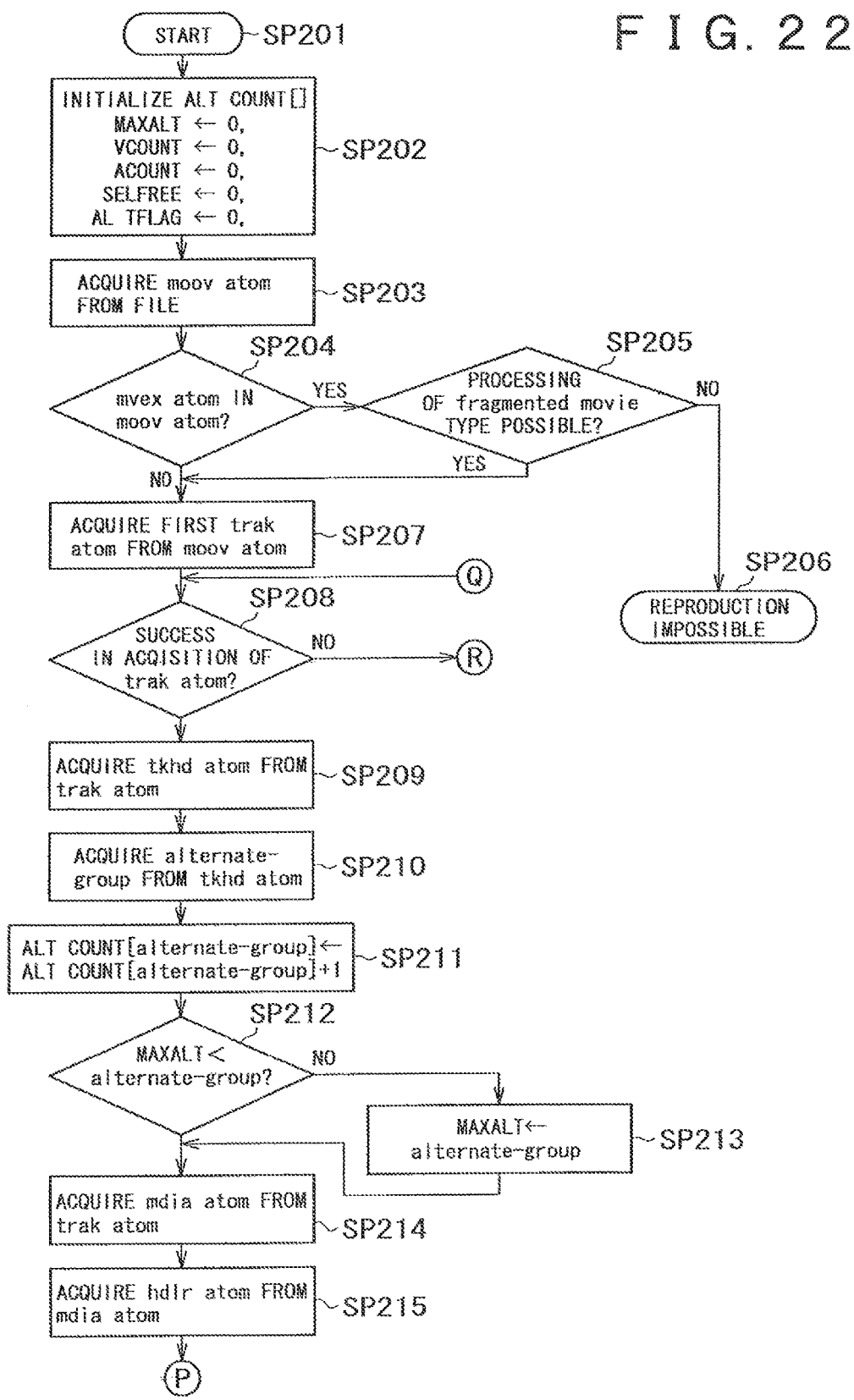
FIGS. 22 to 24 are flow charts illustrating a file reproduction possibility discrimination process of an optical disk apparatus according to a sixth embodiment of the present invention.
Figure 23:
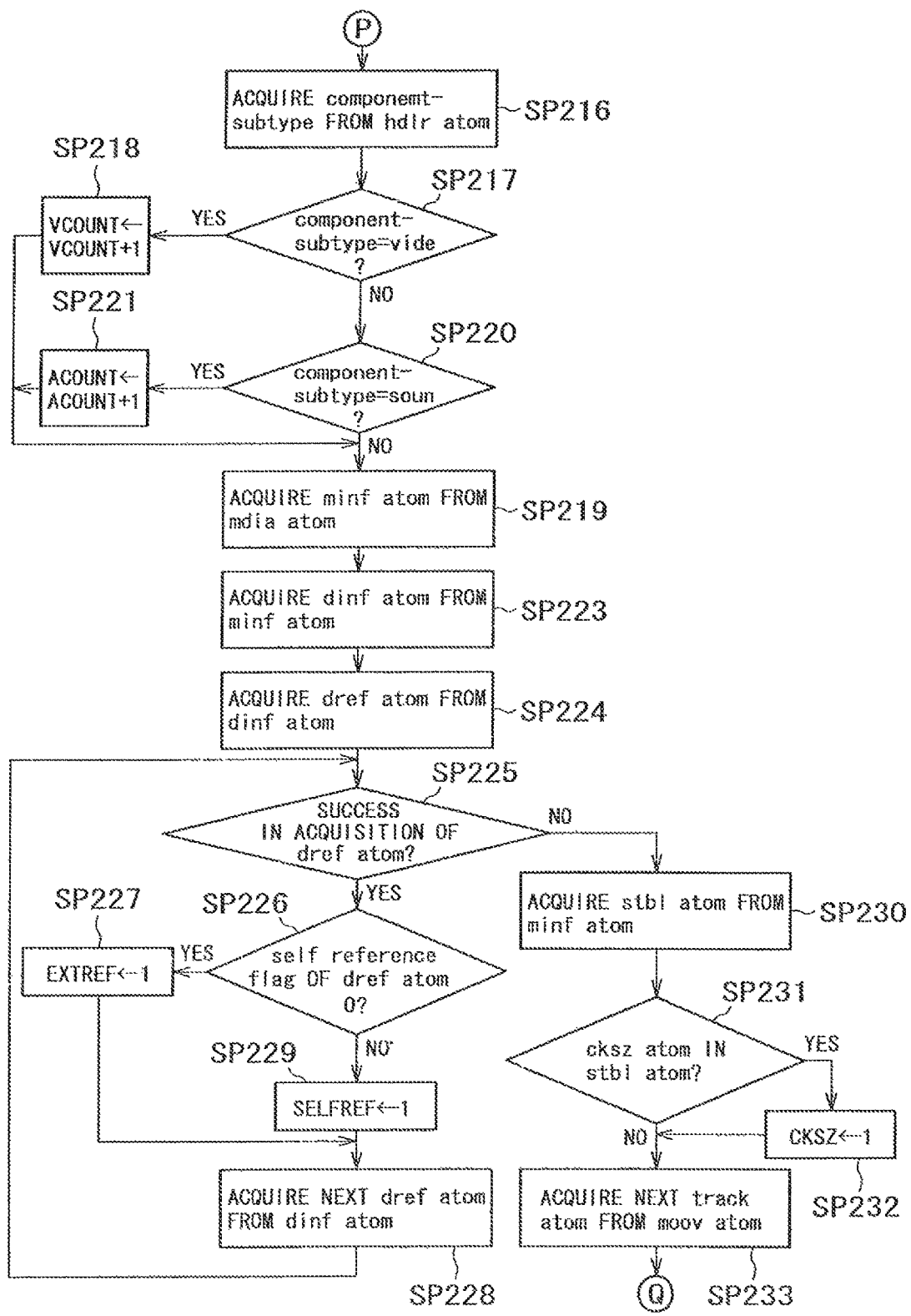
Figure 24:
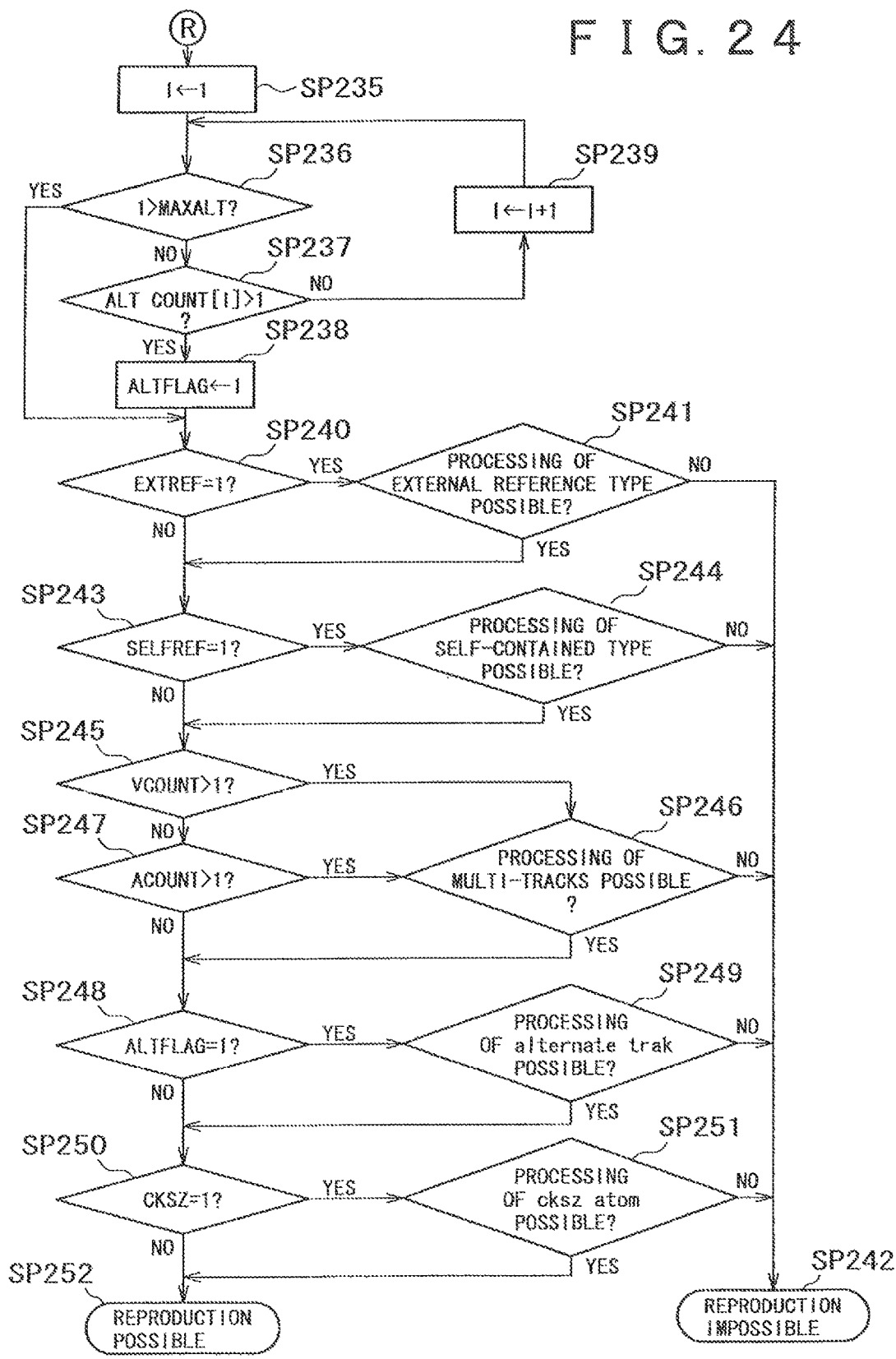

In the present embodiment, also it is discriminated in the file reproduction possibility discrimination process whether or not a QuickTime movie file has a file structure with which it can be reproduced normally. FIGS. 22 to 24 illustrate a processing procedure in the discrimination process regarding the file structure of a QuickTime movie file. It is to be noted that the present embodiment has a same configuration as that in the first to fifth, embodiments described hereinabove except that the processing procedure illustrated in FIGS. 22 to 24 is added to the file reproduction possibility discrimination process according to the first to fifth, embodiments described above. Therefore, detailed description is given below only of the processing-procedure illustrated in FIGS. 22 to 24 while overlapping description of the configuration of the other portion is omitted herein to avoid redundancy.

After the processing procedure is started, the system controlling microcomputer advances the processing from step SP201 to step SP202, at which it sets variables ALT COUNT, MAXALT, VCOUNT, ACOUND, SELFREF, ALTFLAG and so forth to the value 0 to initialize the variables. The variable ALT COUNT [n] is an array variable whose array elements are count values representative, of track numbers of each alternate group (alternate-group). The variable MAXALT is a variable corresponding to a maximum value of the alternate group (alternate-group). The variable VCOUNT is a count value representative of a video track, and the variable ACOUNT is a count value representative of an audio track. Further, the variable SELFREF is a variable according to a flag whose reference type indicates the self contained type, and the variable ALTFLAG is a flag indicative of presence of an alternate track.

Then, the system controlling microcomputer advances the processing step SP203, at which it acquires the movie resource atom (Movie Resource Atom: moov atom) of the QuickTime movie file from the QuickTime movie file. Then at step SP204, the system controlling microcomputer discriminates whether or not an extension atom (mvex atom) regarding a video is set to the movie resource atom. If an affirmative result is obtained, then the processing advances to step SP205, at which the system controlling microcomputer discriminates whether or not a fragment movie can be reproduced. If an affirmative result is obtained, then the system controlling microcomputer advances the processing to step SP206, at which it sets the QuickTime movie file as a file which is difficult to reproduce normally, whereafter it returns the processing to the original processing procedure.

On the other hand, if a negative result is obtained at step SP204, or if an affirmative result is obtained at step SP205, then the system controlling microcomputer advances the processing to step SP207, at which it acquires the first track atom (Track Atom: trak atom) from the movie resource atom. Then at step SP208, the system controlling microcomputer discriminates whether or not a track atom is acquired successfully. If an affirmative result is obtained, then the system, controlling microcomputer advances the processing to step SP210, at which it acquires the track header atom (Track Header Atom: tkhd Atom) from the track atom. Then at step SP210, the system controlling microcomputer acquires a value of the alternate group (alternate-group) from the track header atom.

Then at step SP211, the system controlling microcomputer increments the array element ALT COUNT [alternate-group] corresponding to the alternate group by the value 1. Then at step SP212, the system controlling microcomputer discriminates whether or not the value of the alternate group acquired from the track header atom is higher than the variable MAXALT. If an affirmative result is obtained, then the system controlling microcomputer advances the processing to step SP213, at which it rewrites the value of the variable MAXALT with the value of the alternate group, whereafter it advances the processing to step SP214. On the other hand, if a negative result is obtained at step SP212, then the processing advances directly from step SP212 to step SP214.

At step SP214, the system controlling microcomputer acquires the media atom (Media Atom: mdia atom) from the acquired track atom, and at step SP215, acquires the media handler reference atom (Media Handler Reference Atom: hdlr atom) from the media atom. Then at step SP216, the system controlling microcomputer acquires the component subtype (component-subtype) from the media handler reference atom, and then at step SP217, discriminates based on the value of the component subtype whether or not the track is a video track.

If an affirmative result is obtained, then the system controlling microcomputer advances the processing from step SP217 to step SP218, at which it increments the variable VCOUNT which is a count value representative of a video track by the value 1, whereafter it advances the processing to step SP219. On the other hand, if a negative result is obtained at step SP217, then the processing advances from step SP217 to step SP220, at which it discriminates from the value of the component subtype whether or not the track is an audio track.

If an affirmative result is obtained, then the system controlling microcomputer advances the processing from step SP220 to step SP221, at which it increments the variable ACOUNT which is a count value representative of an audio track by the value 1, and further to step SP219. On the other hand, if a negative result is obtained at step SP220, then the system controlling microcomputer advances the processing from Step SP220 to step SP219.

At step SP219, the system controlling microcomputer acquires the media information atom (Media Information Atom: minf atom) from the media atom (Media Atom: mdia atom). Then at step SP223, the system controlling microcomputer acquires the data information atom (Data Information Atom: dinf atom) from the media information atom.

Then at step SP224, the system controlling microcomputer acquires the data reference atom (Data Reference Atom: drsf atom) from the data information atom, and then at step SP225, discriminates whether or not the data reference atom is acquired successfully. If an affirmative result is obtained, then the system controlling microcomputer advances the processing to step SP226, at which it discriminates whether or not the self containment flag (self reference flag) indicating that the reference type is the self contained type is set to the value 1 in the acquire data reference atom. If an affirmative result is obtained, then the system controlling microcomputer advances the processing to step SP227, at which it sets, the variable EXTREF representing that the reference type is the external reference type to the value 1, whereafter it advances the processing to step SP228.

On the other hand, if a negative result is obtained at step sP226, then the system-controlling microcomputer advances the processing to step SP229, at which it discriminates whether or not the self reference type flag (self reference flag) indicating that the reference type is the self containment type is set to the value 0. If an affirmative result is obtained, then the System controlling microcomputer advances the processing to step SP227, at which it sets the variable SELFREF indicating that the reference type is the self containment type, to the value 1, whereafter it advances the processing to step SP228.

Thus, at step S228 after the system controlling microcomputer sets the configuration of the external file to the variable in this manner, it acquires a next data reference atom from the data information atom, whereafter it returns the processing to step SP225. Thus, the system controlling microcomputer discriminates the reference type with regard to all of the data reference atoms set to the data information atom. After the process for all of the data reference atoms is completed, since a negative result is obtained at step SP225, the processing now advances from step SP225 to step SP230.

At step SP230, the system controlling microcomputer acquires the sample table atom (Sample Table Atom: stbl atom) from the media information atom, and then at step SP231, discriminates whether or not the sample table atom includes a chunk size atom (Chunk Size Atom: cksz atom). If an affirmative result is obtained, then the system controlling microcomputer advances the processing to step SP232, at which it sets the variable CKSZ representative of whether or not a chunk size atom is present to the value 1. Thereafter, the processing advances to step SP233. On the other hand, if a negative result is obtained at step SP231, then the system controlling microcomputer advances the processing from step SP231 to step SP233.

At step S233, the system controlling microcomputer acquires a next track atom from the movie resource atom. Then, the system controlling microcomputer advances the processing returns to step SP207 (FIG. 22). Consequently, in the present embodiment, information of a file structure which is a discrimination material regarding whether or not decoding is possible is successively acquired in regard to the tracks. Then, if the process is completed for all of the tracks, then the processing now advances from step SP208 to step SP235 (FIG. 24).

At step S235, the system controlling microcomputer sets a processing variable I to the value 1. Then at step SP236, the system controlling microcomputer discriminates whether or not the variable MAXALT regarding a track successively specified by the processing variable I is lower than the value 1. If a negative result is obtained, then the system controlling microcomputer advances the processing from step. SP236 to step SP237, at which it discriminates whether or not the value of the array element ALT COUNT [I] is higher than the value 1. If a negative result is obtained, then since, in this instance, the alternate group does not include an alternate track, the system controlling microcomputer advances the processing from step SP237 to step SP239. At step SP239, the system controlling microcomputer increments the variable I to change over the processing object to a next alternate group. Thereafter, the processing returns to step SP236.

On the other hand, if an affirmative result is obtained at step SP237, then the system controlling microcomputer advances the processing from step SP237 to step SP238, at which it sets the variable ALTFLG to the value 1, whereafter it advances the processing to step SP240. On the other hand, if an affirmative result is obtained at step SP236, then the system controlling microcomputer advances the processing from step SP236 to step SP240. Consequently, in the present embodiment, if an alternate track (Alternate track) is present for any track, the variable ALT-FLAG is set to the value 1.

At step SP240, the system controlling microcomputer discriminates whether or not the variable EXTREF has the value 1. If an affirmative result is obtained, then: the system controlling microcomputer advances the processing to step SP241, at which it discriminates whether or not the external reference file can be processed. If a negative result is obtained, then the system controlling microcomputer advances the processing from step SP241 to step SP242, at which it sets the QuickTime movie file as a file which is difficult to reproduce, whereafter it returns the processing to the original processing procedure.

On the other hand, if an affirmative result is obtained at step SP241, then the system controlling microcomputer advances the processing from step SP241 to step SP243. Also when a negative result is obtained at step SP240, the processing advances to step SP243 similarly. At step SP243, the system controlling microcomputer discriminates whether or not the variable SELFREF has the value 1. If an affirmative result is obtained, then the system controlling microcomputer advances the processing to step SP244, at which it discriminates whether or not the self containment type can be processed. If an affirmative result is obtained, then the system controlling microcomputer advances the processing from step SP244 to step SP242, at which it sets the QuickTime movie file as a file which is difficult to reproduce normally. Thereafter, the processing returns to the original processing procedure.

On the other hand, if an affirmative result is obtained at step SP244, then the system controlling microcomputer advances the processing from step SP244 to step SP245. Also when a negative result is obtained at step SP243, the processing advances to step SP245 similarly. At step SP245, the system controlling microcomputer discriminates whether or not the variable VCOUNT is higher than the value 1. If an affirmative result is obtained, then the system controlling microcomputer advances the processing to step SP246, at which, it discriminates whether or not multi-tracks, of a video can be processed. If a negative result is obtained, then the system controlling microcomputer advances the processing from step SP246 to step SP242, at which it sets the QuickTime movie file as a file which is difficult to reproduce normally. Thereafter, the processing returns to the original processing procedure.

On the other hand, if a negative result is obtained at step SP245, then the system controlling microcomputer advances the processing from step SP245 to step SP247, at which it discriminates whether or not the variable ACOUNT is higher than the value 1. If an affirmative result is obtained, then the system controlling microcomputer advances the processing to step SP246, at which it discriminates whether or not multi-tracks of an audio can be processed. If a negative result is obtained, then the system controlling microcomputer advances the processing from step SP246 to step SP242, at which it sets the QuickTime movie file as a file which is difficult to reproduce normally, whereafter the processing returns to the original processing procedure.

On the other hand, if a negative result is obtained at step SP247, or if an affirmative result is obtained at step SP246, then the system controlling microcomputer advances the processing to step SP248, at which it discriminates whether or not the variable ALTFLAG regarding an alternate trak is higher than the value 1. If an affirmative result is obtained, then the system controlling microcomputer advances the processing to step SP249, at which it discriminates whether or not an alternate track can be processed. If a negative result is obtained, then the system controlling microcomputer advances the processing from step SP249 to step SP242, at which it sets the QuickTime movie file as a file which is difficult to reproduce normally, whereafter the processing returns to the original processing procedure.

On the other hand, if an affirmative result is obtained at step SP249, then the system controlling microcomputer advances the processing from step SP249 to step SP250. Also when a negative result is obtained at step SP248, the processing advances to step SP250 similarly. At step S250, the system controlling microcomputer discriminates whether or not the variable CKSZ has the value 1. If an affirmative result is obtained, then the system controlling microcomputer advances the processing to step SP251, at which it discriminates whether or not a chunk size atom can be processed. If a negative result is obtained, then the system controlling microcomputer advances the processing from step SP251 to step SP242, at which it sets the QuickTime movie file as a file which is difficult to reproduce normally, whereafter the processing returns to the original processing procedure.

However, if an affirmative result is obtained at step SP251, or if a negative result is obtained at step SP250, then the system controlling microcomputer advances the processing to step SP252, at which it sets the QuickTime movie file as a file which is difficult to reproduce normally. Thereafter, the processing returns to the original processing procedure.

With the embodiment having the configuration described above, since the discrimination of whether or not normal reproduction is possible is performed additionally in regard to the file structure of a QuickTime movie file, only those files which can be reproduced normally can be provided to the user with a higher degree of accuracy. Therefore, the convenience in use of the user can be further improved as much.

7. Seventh Embodiment

In the present embodiment, information regarding a file structure used as a discrimination material for discrimination of whether or not normal reproduction is possible in the sixth embodiment is collected to form an atom such that the information mentioned is disposed collectively on the top side of a QuickTime movie file.

In particular, in the present embodiment, information (feature) indicative of a type of actual data is set similarly as in the profile atom described hereinabove with reference to FIGS. 8 to 12, and actual data illustrated in FIG. 25 is registered. It is to be noted that tkst is set to the information (feature) indicative of the type of the actual data. In the present embodiment, information representative of presence of a fragment movie atom, presence of a modifying track, presence of an alternate track, the external reference type, the self containment type, and presence of a chunk size atom are allocated to the actual data. Consequently, in the present embodiment, an atom regarding the file structure is formed as seen from FIG. 26 in contrast with FIG. 12. It is to be noted that, in the example illustrated in FIG. 26, it is described that an alternative track is present for the track of the track ID=4 and data is referred to both in the external reference type and the self containment type.

Consequently, upon recording of a QuickTime movie file, the system controlling microcomputer acquires corresponding information from information set to each atom and produces an atom regarding the file structure. Further, the system controlling microcomputer performs a file reproduction possibility discrimination process illustrated in FIG. 27 in place of the reproduction possibility discrimination process illustrated in FIGS. 21 to 23 to discriminate whether or not the optical disk apparatus 1 is ready for the file structure of the type described.

Figure 27:
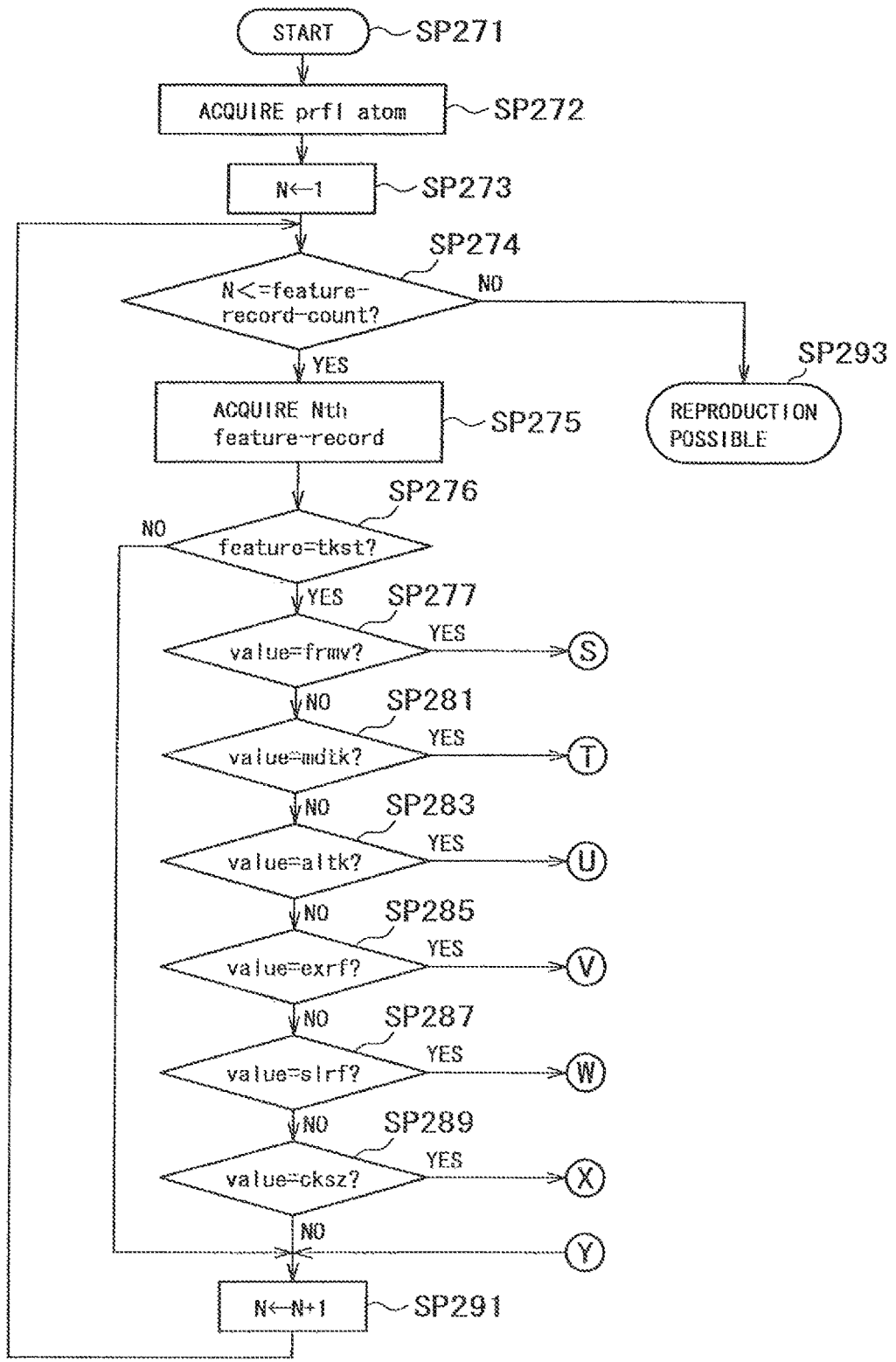
FIGS. 27 and 28 are flow charts illustrating a file reproduction possibility discrimination process of the optical disk apparatus according to the seventh embodiment of the present invention.

Referring to FIG. 27, after the processing procedure illustrated is started, the system controlling microcomputer advances the processing from step SP271 to step SP272, at which it acquires an atom (prft Atom) of a file structure according to FIG. 26. At step SP273, the system controlling microcomputer places the value 1 into the processing variable N corresponding to a record of the list illustrated in FIG. 26. Further at step SP274, the system controlling microcomputer discriminates whether or not the processing variable N is lower than the count value (feature-record-count) of the list. If an affirmative result is obtained, then the system controlling microcomputer acquires the list (feature-record) of actual data in the Nth column at step SP275.

Then at step SP276, the system controlling microcomputer discriminates whether or not information regarding the file structure is set in the acquired list. If an affirmative result is obtained, then the system controlling microcomputer discriminates, at step SP277, whether or not the presence of a fragment movie atom (frmv) is set in the information regarding the file structure. If an affirmative result is obtained, then the system controlling microcomputer advances from step SP277 to step SP278 (FIG. 28), at which it discriminates whether or not the fragment movie can be reproduced. If a negative result is obtained, then the system controlling microcomputer advances the processing to step SP279, at which it sets the QuickTime movie file as a file which, is difficult to reproduce normally, whereafter the processing returns to the original processing procedure.

On the other hand, if a negative result is obtained at step SP277 (FIG. 27), then the system controlling microcomputer advances the processing to step SP281, at which it discriminates whether or not the presence of a flag modifying track (mdtk) is set in the information regarding the file structure. If an affirmative result is obtained, then the system controlling microcomputer advances the processing from step SP281 to step SP282 (FIG. 28), at which it discriminates whether or not the modifying track can be processed. If a negative result is obtained, then the system controlling microcomputer advances the processing to step SP279, at which it sets the QuickTime movie file as a file which is difficult to reproduce normally, whereafter the processing returns to the original processing procedure.

On the other hand, if a negative result is obtained at step SP281 (FIG. 27), then the system controlling microcomputer advances the processing to step SP283, at which it discriminates whether or not the presence of an alternate track (altk) is set in the information regarding the file structure. If an affirmative result is obtained, then the system controlling microcomputer advances the processing from step SP283 to step SP284 (FIG. 28), at which it is discriminated whether or not the alternate track can be reproduced. Here, if a negative result is obtained, then the system controlling microcomputer advances the processing to step SP279, at which it sets the QuickTime movie file as a file which is difficult to reproduce normally, whereafter the processing returns to the original processing procedure.

On the other hand, if a negative result is obtained at step SP283 (FIG. 27), then the system controlling microcomputer advances the processing to step SP285, at which it discriminates whether or not presence of an external reference (extk) is set in the information regarding the file structure. If an affirmative result is obtained, then the system controlling microcomputer advances the processing from step SP285 to step SP286 (FIG. 28), at which it discriminates whether or not the external reference type can be processed. Here, if a negative result is obtained, then the system controlling microcomputer advances the processing to step SP279, at which it sets the QuickTime movie file as a file which is difficult to reproduce normally, whereafter the processing returns to the original processing procedure.

On the other hand, if a negative result is obtained at step SP285 (FIG. 27), then the system controlling microcomputer advances the processing to step SP287, at which it discriminates whether or not the presence of the self containment type (sltk) is set in; the information regarding the file structure. If an affirmative result is obtained, then the system controlling microcomputer advances the processing from step SP287 to step SP288 (FIG. 28), at which it discriminates whether or not the self containment type can be processed. If a negative result is obtained, then the system controlling microcomputer, advances the processing to step SP279, at which it sets the QuickTime movie file as a file which is difficult to reproduce normally, whereafter the processing advances to the original processing procedure.

On the other hand, if a negative result is obtained at step S287 (FIG. 27), then the system controlling microcomputer advances to step SP289, at which it discriminates, whether or not presence of a chunk size atom (cksz) is set in the information regarding the file structure. Here, if an affirmative result is obtained, then the system controlling microcomputer advances the processing from step SP289 to step SP290 (FIG. 28), at which it discriminates whether or not processing is possible. If a negative result is obtained, then the system controlling microcomputer advances the processing to step SP279, at which it sets the QuickTime movie file as a file which is difficult to reproduce normally, whereafter the processing returns to the original processing procedure.

On the other hand, if a negative result is obtained at step SP289, or if a negative result is obtained at step SP276 (FIG. 27), then the system controlling microcomputer increments the processing variable N by the value 1 at step SP29 thereby to change over the processing object to information regarding a next structure. Thereafter, the processing advances returns to step SP274.

On the other hand, if an affirmative result is obtained at any of steps SP278, SP282, SP284, SP286, SP288 and SP290, then the system controlling microcomputer returns the processing to step SP291, at which it changes over the processing object to information regarding a next file structure. Thereafter, the processing returns to step SP274.

Consequently, in the present embodiment, the system controlling microcomputer successively discriminates whether or not a record can be reproduced in the order as defined in the list set in information regarding the file structure. Then, when all records can be reproduced, a negative result is obtained at step SP274. Consequently, the processing now advances from step SP274 to step SP293, at which the system controlling microcomputer sets the QuickTime movie file as a file which can be reproduced normally, whereafter the processing returns to the original processing procedure.

In the present embodiment, information regarding a file structure used as a discrimination material for discriminating whether or not normal reproduction is possible is collected to form an atom, and such information is disposed collectively on the top side of the QuickTime movie file using the atom. Consequently, the processing speed can be improved when compared with the fifth embodiment thereby to achieve advantages similar to those of the first embodiment.

8. Eighth Embodiment

In the present embodiment, actual data of a list in the seventh embodiment is encoded to reduce the data amount of a QuickTime movie file and simplify the process of the system controlling microcomputer similarly to that by the configuration according to the fourth embodiment in contrast with the third embodiment.

Figure 28:
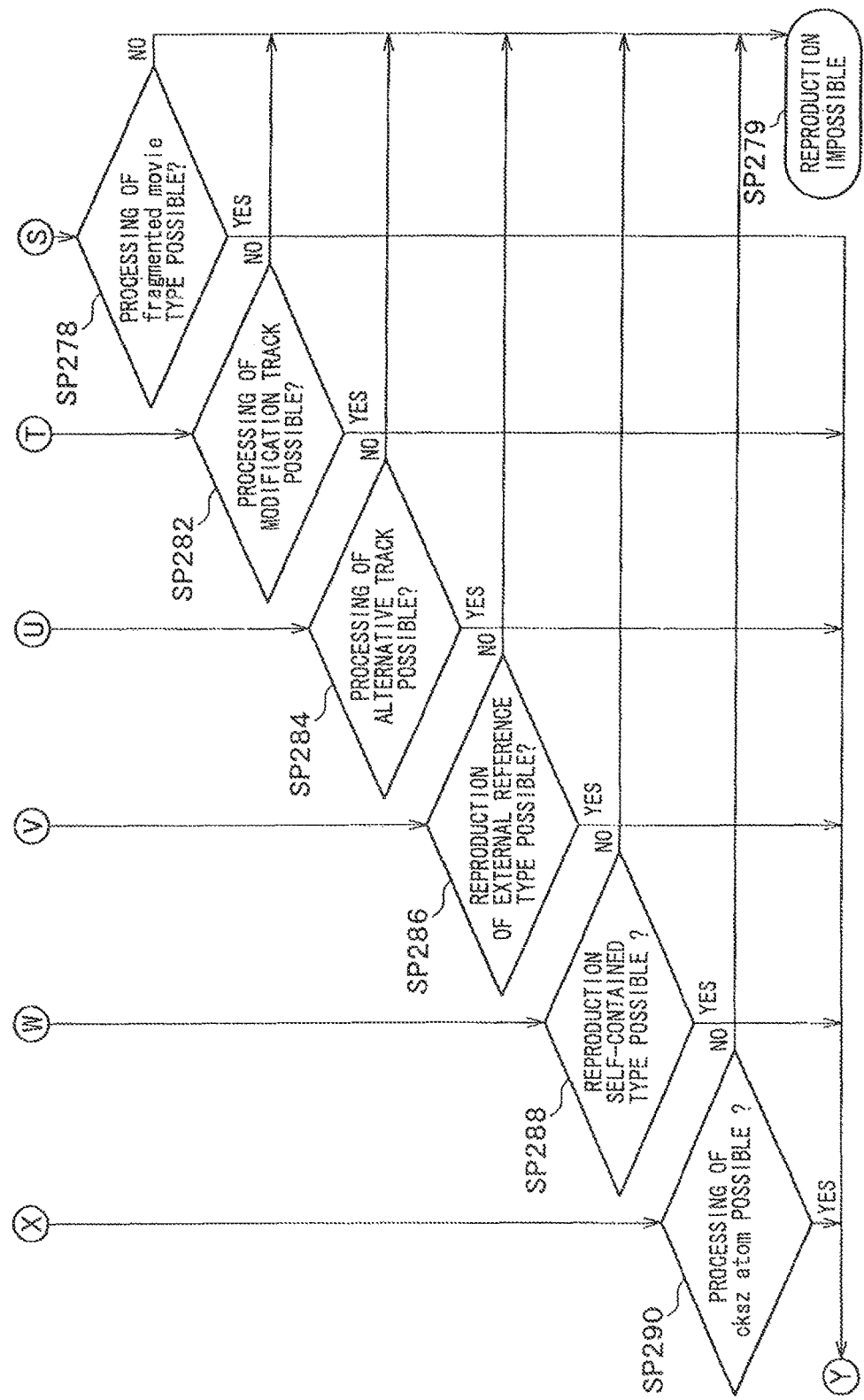

FIG. 29 illustrates contents regarding the encoding. In the present embodiment, fnsc is set to the column (feature) which represents the type of actual data described hereinabove with reference to FIG. 26, and encoded actual data illustrated in FIG. 28 is set there. Consequently, the system controlling microcomputer produces a QuickTime movie file so as to be ready for the encoding and discriminates whether or not normal reproduction is possible in accordance with the code. It is to be noted that, also in this instance, for the actual data (feature-record) to which the fnsc is set, the track ID is set to 0, and an identifier same as the major brand of the file compatibility atom is placed in the subpart ID.

Figure 30:
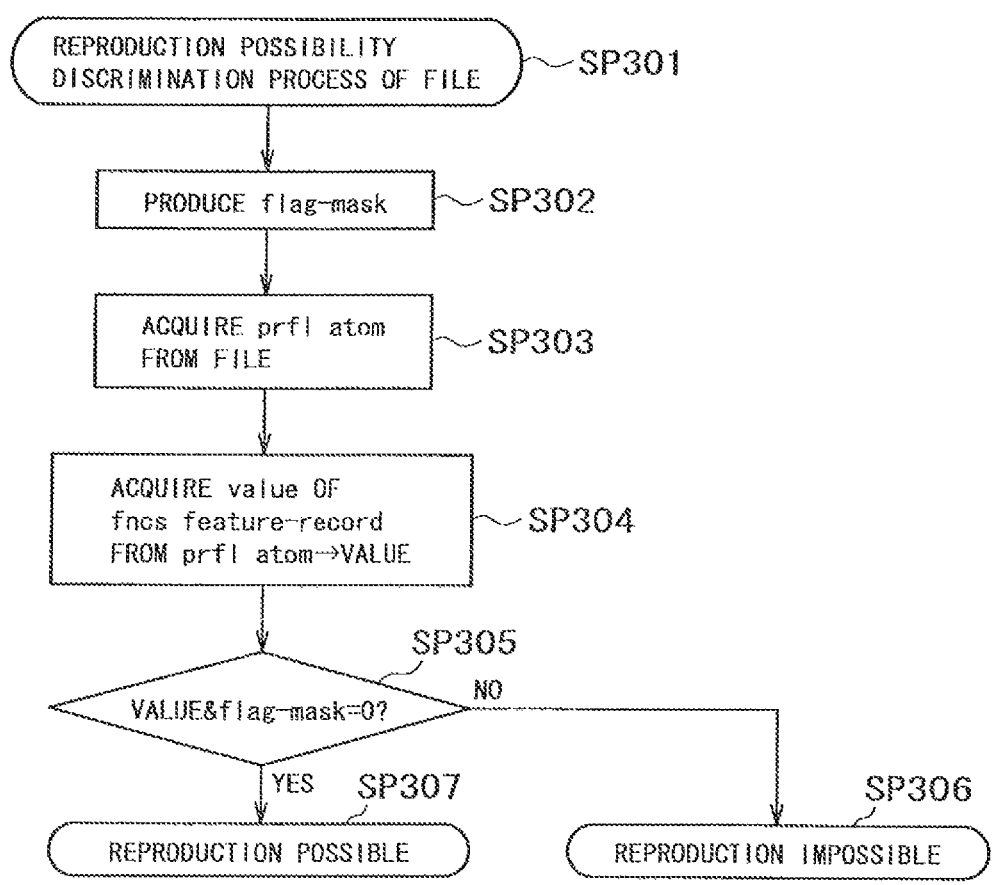
FIG. 30 is a flow chart illustrating a file reproduction possibility discrimination process of the optical disk apparatus according to the eighth embodiment of the present invention.

FIG. 30 illustrates a file reproduction possibility discrimination process according to the present embodiment. In the present embodiment, the processing procedure illustrated in FIG. 30 is executed in place of the processing procedure illustrated in FIG. 27.

Referring to FIG. 30, after the processing procedure is started, the system controlling microcomputer advances the processing from step SP301 to SP302, at which it produces a flag mask for the optical disk apparatus. In the flag mask, the value 0 is set to each code portion of a bit string of encoded actual data regarding the file structure illustrated in FIG. 27 for which the optical disk apparatus is ready while the value 1 is set to each code portion for which the optical disk apparatus is not ready.

After the mask is set in this manner, the system controlling microcomputer acquires a profile atom at next step SP303 and then acquires actual data to which fnsc is set from the profile atom at step SP304. Then at step SP305, the system controlling microcomputer discriminates the actual data from AND operation of the actual data and the flag mask to detect whether or not the actual data includes an item for which the optical disk apparatus is not ready. If an item for which the optical disk apparatus is not ready is detected, then the system controlling microcomputer advances the processing from step SP305 to step SP306, at which it sets the QuickTime movie file as a file which is difficult to produce normally, whereafter the processing returns to the original processing procedure. On the other hand, if an item for which the optical disk apparatus is not ready is not detected, then the processing advances now from step SP305 to step SP307, at which the system controlling microcomputer sets the QuickTime movie file as a file which is difficult to reproduce normally, whereafter the processing returns to the original processing procedure.

In the present embodiment, since information regarding a file structure is encoded, the data amount of a QuickTime movie file can be reduced and the process of the system controlling microcomputer can be simplified, and advantages similar to those of the seventh embodiment can be anticipated.

9. Ninth Embodiment

In the present embodiment, an index file of files recorded on an optical disk is recorded on the optical disk. It is to be noted that the present embodiment is configured similarly to the embodiments described hereinabove except that it is different in configuration, in regard to the index file. Therefore, the present embodiment is described suitably in connection with the configuration shown in FIG. 1.

The index file is formed from a series of entries in the form of blocks of extract information extracted from files recorded on an optical disk 2. Thus, the index file can be used to select a desired file simply and with certainty from among a large number of files recorded on the optical disk 2 based on the extract information.

The index file has a hierarchical structure formed from atoms similar to those of a QuickTime movie file so that resources relating to file production and processing can be utilized effectively making use of the file producer 15 and the file decoder 16.

Figure 31:
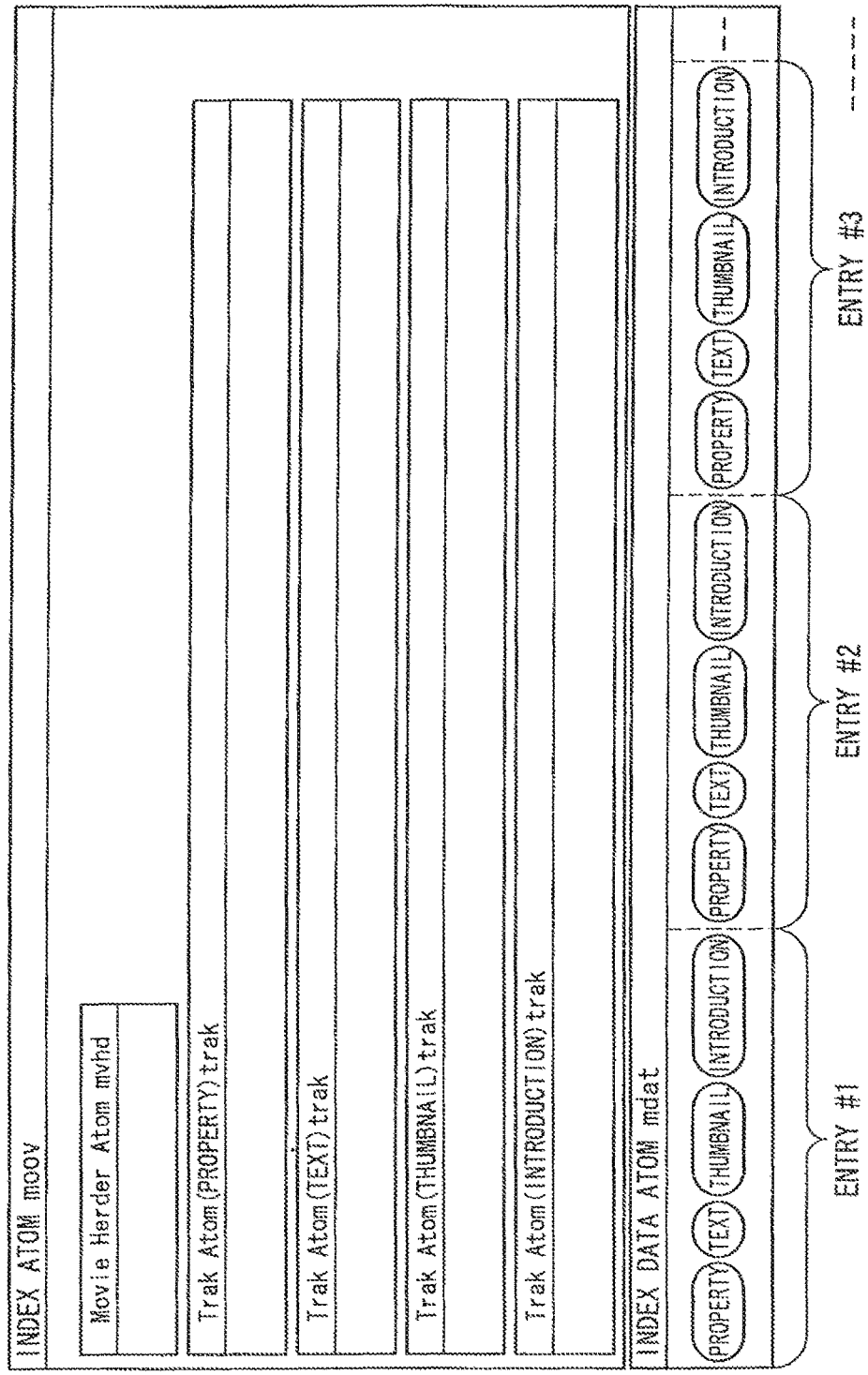
FIG. 31 is a diagrammatic view illustrating an index file for use with an optical disk apparatus according to a ninth embodiment of the present invention.

In particular, the index file is formed from an index data atom which is a group data of extract information and an index atom which is a group of management data for managing the data group as seen in FIG. 31. The index data atom includes actual data of a disk title, actual data of extract information of the files and so forth allocated as chunks thereto. Meanwhile, management information of the actual data allocated to the index data atom is allocated to the index atom.

The extract information is information extracted partly from management object files which introduce contents of the management object files in the index file. Therefore, although the extract information varies depending upon the types of the management object files, where the management object files are QuickTime movie files of video data and audio data as in the present embodiment, three kinds of data, that is, text data, thumbnail picture data and intro data corresponding to property data are applied to the extract data.

The index data atom manages extract information of each management object file with an entry which includes three kinds of data, that is, text data, thumbnail picture data and intro data in combination with respect to a property corresponding to the management object file. It is to be noted that, in the top entry #1, extract information of the disk title is allocated in place of a management object file. Further, in the index data atom, property data, text data, thumbnail data and intro data are set to chunks and allocated thereto.

The property data represents a property of the disk title or a management object file, and extract information in the form of binary data set to the disk title or a management object file is allocated together with management information of the entry. It is to be noted that the property data is provided without fail even where the succeeding text, thumbnail picture and intro data are not provided because the type of the management object file is different.

The text data includes data representative of a character string of the disk title or the title of a management object file. The thumbnail picture data is formed from data of a still picture representative of the disk title or contents of the management object file, and, for example, the top picture of the management object file is allocated to the thumbnail picture of the management object file. In contrast, to the thumbnail picture of the disk title a thumbnail picture, for example, of a specific entry of a management object file is allocated in accordance with selection of the user. It is to be noted that the thumbnail picture of each management object file may otherwise be set by selection of the user.

The intro data is audio data for a short period of time representative of contents of a management object file. To the intro data of a management object file, audio data for several seconds, typically for 5 seconds, for example, after reproduction of a corresponding file is started is allocated. In contrast, to the intro data of the disk title, intro data of a specific entry of, for example, each management object file is allocated by selection of the user. It is to be noted that also the intro data of a management object file may otherwise be set by selection of the user.

The index atom includes track atoms for property, text, thumbnail picture and intro data corresponding to the property, text, thumbnail picture and intro data of the index data atom, respectively, and a movie header atom which supervises the track atoms. To the track atoms, recording position information of entries regarding corresponding property, text, thumbnail picture and Intro data are set.

Thus, in the present embodiment, for example, titles, thumbnail pictures or the like are displayed in a table display and provided to the user or intro data are successively reproduced and provided to the user so that the user can simply select a desired file. Further, the file selected in this manner is reproduced in accordance with setting of a corresponding property and provided to the user.

In the present embodiment, information regarding decoding and information regarding a file structure according to the embodiments described hereinabove are, set to actual data of the property. Consequently, in the present embodiment, even if each QuickTime movie file is not reproduced every time, whether or not a QuickTime movie file can be reproduced normally can be detected in a shorter period of time.

Meanwhile, for example, a computer may record a QuickTime movie file on an optical disk 2. In this instance, the QuickTime movie file to be recorded by the computer may have set thereto such information regarding decoding and information regarding a file structure according to the third to eight embodiments as described above, or such information may not be set to the QuickTime movie file. In such instances, management information relating to a file management system and an index file are compared with each other. Then, where the QuickTime movie file is registered in the index file, the information regarding decoding and information regarding a file structure registered in the index file are used to discriminate whether or not the QuickTime movie file can be reproduced normally. However, where the QuickTime movie file is not registered in the index file, a process similar to that used in the present embodiment described above is used to discriminate whether or not the QuickTime movie file can be reproduced normally.

In response to an instruction of the user or during free time, information regarding decoding and information regarding a file structure of the QuickTime movie file which is not registered in the index file are registered into the index file.

According to the present embodiment, when an index file of files recorded on a recording medium is produced from a series of entries in the form of blocks of extract information extracted from and coordinated with the files recorded on the recording medium and is recorded on the recording medium, information regarding decoding and information regarding a file structure are set to the index file. Consequently, a desired file can be selected simply and rapidly, and advantages similar to those of the embodiments described hereinabove can be anticipated.

10. Tenth Embodiment

In the present embodiment, all of files which belongs to a directory designated by the user are displayed in place of a selective table display of those files which can be reproduced normally according to the embodiments described hereinabove, and it is displayed by a user interface in the display whether or not each of the files can be reproduced normally. On the other hand, selection by the user of a file which cannot be reproduced normally in this manner is not accepted.

Also where those files which can be decoded normally and those files which are difficult to decode normally are displayed distinctly from each other as in the present embodiment thereby, to display files recorded on a recording medium in a table display such that only those files which can be decoded normally can be selected, similar advantages to those achieved by the embodiments described hereinabove can be achieved.

11. Other Embodiments

It is to be noted that, in the embodiments described above, the present invention is applied to an optical disk apparatus. However, the present invention is not limited to this but can be applied widely where information is recorded on various recording media such as a hard disk and a memory card.

Further, in the embodiments described above, a QuickTime movie file is recorded on an, optical disk. However, the present invention is not limited to this but can be applied widely where files are recorded in various hierarchical structures and also where video data and audio data in the form of compressed data are recorded.

Furthermore, in the embodiments described above, an encoder and a decoder are integrated with each other. However, the present invention is not limited to this but can be applied widely where an encoder and/or a decoder are implemented by a process of software and also where an encoder and/or a decoder are provided in an external apparatus from which video data and audio data in the form of compressed data are inputted so as to be recorded.

While preferred embodiments of the present invention have been described using specific, terms, such description is for illustrative purposes only, and it is to be understood that changes and variations may be made without departing from the spirit or scope of the following claims.

What is claimed is:

1. A reproducing apparatus comprising:
an acquisition unit configured to acquire reference data regarding a plurality of media contents;
a selecting unit configured to select at least one of the media contents based on the reference data; and
a reproducing unit configured to reproduce the selected media content,
wherein the reference data has a hierarchical structure including a plurality of hierarchies, and the reference data comprises, in a higher hierarchy of the reference data, data about a type of a codec of the media content, a bit rate of the media content, width and height of a picture size of the media content, and identification for the media content, and the reference data comprises, in a lower hierarchy of the reference data, data about a timescale of the media content.

2. The reproducing apparatus according to claim 1, wherein the reference data comprises:
frame rate of the media content, and
sampling frequency of the media content.

3. The reproducing apparatus according to claim 2, wherein the reproducing apparatus has a processing capacity, and the reproducing unit reproduces the media content according to the processing capacity of the reproducing apparatus.

* * * * *